(12) United States Patent
Bang et al.

(10) Patent No.: US 11,340,776 B2
(45) Date of Patent: May 24, 2022

(54) ELECTRONIC DEVICE AND METHOD FOR PROVIDING VIRTUAL INPUT TOOL

(71) Applicant: Samsung Electronics Co., Ltd., Suwon-si (KR)

(72) Inventors: Myojin Bang, Suwon-si (KR); Minjeong Moon, Suwon-si (KR); Seoyoung Yoon, Suwon-si (KR); Minjung Moon, Suwon-si (KR); Jaegi Han, Suwon-si (KR); Jiyoon Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/428,066

(22) Filed: May 31, 2019

(65) Prior Publication Data

US 2020/0042167 A1 Feb. 6, 2020

(30) Foreign Application Priority Data

Aug. 2, 2018 (KR) ........................ 10-2018-0090321

(51) Int. Cl.
*G06F 3/04883* (2022.01)
*G06F 3/04845* (2022.01)
*G06F 3/04886* (2022.01)

(52) U.S. Cl.
CPC ...... *G06F 3/04883* (2013.01); *G06F 3/04845* (2013.01); *G06F 3/04886* (2013.01);
(Continued)

(58) Field of Classification Search
CPC .. G06F 3/0488; G06F 3/0484; G06F 3/04886; G06F 3/04883; G06F 3/04845; G06F 2203/04803; G06F 2203/04804
See application file for complete search history.

(56) References Cited

U.S. PATENT DOCUMENTS

| 5,681,220 A | 10/1997 | Bertram et al. |
| 2005/0114825 A1* | 5/2005 | Leung .................. G06F 1/1616 717/100 |

(Continued)

FOREIGN PATENT DOCUMENTS

| KR | 0160803 B1 | 12/1998 |
| KR | 10-2007-0079858 A | 8/2007 |
| KR | 10-2014-0055327 A | 5/2014 |

OTHER PUBLICATIONS

International Search Report dated Sep. 27, 2019, issued in International Patent Application No. PCT/KR2019/006579.

(Continued)

*Primary Examiner* — Daniel Samwel
(74) *Attorney, Agent, or Firm* — Jefferson IP Law, LLP

(57) ABSTRACT

An electronic device is provided. The electronic device includes a communication circuitry, at least one memory storing instructions, a display, and at least one processor. The at least one processor, when executing the instructions, is configured to display, using the communication circuitry, a first user interface of an application being executed in the electronic device on a display of an external device, while displaying the first user interface on the display of the external device, receive a specified input, and in response to receiving the specified input, display, on the display of the electronic device, a virtual touch pad in a first area and a virtual keyboard in a second area distinct from the first area.

19 Claims, 23 Drawing Sheets

(52) U.S. Cl.
CPC .............. *G06F 2203/04803* (2013.01); *G06F 2203/04804* (2013.01)

(56) References Cited

U.S. PATENT DOCUMENTS

| | | | |
|---|---|---|---|
| 2006/0224986 A1* | 10/2006 | Lindsay | G06F 3/0481 715/766 |
| 2010/0100839 A1* | 4/2010 | Tseng | G06F 1/1643 715/780 |
| 2010/0169818 A1* | 7/2010 | Hughes | G06F 3/0481 715/773 |
| 2011/0248822 A1* | 10/2011 | Sarihan | H04N 7/15 340/5.81 |
| 2013/0016040 A1 | 1/2013 | Ahn et al. | |
| 2013/0082840 A1* | 4/2013 | Kumar | H04M 1/0202 340/540 |
| 2013/0120274 A1* | 5/2013 | Ha | G06F 3/04883 345/168 |
| 2013/0234942 A1* | 9/2013 | Yoo | G06F 3/04886 345/168 |
| 2013/0246954 A1* | 9/2013 | Gray | G06F 1/1694 715/767 |
| 2014/0059449 A1 | 2/2014 | Kim et al. | |
| 2014/0244099 A1* | 8/2014 | Kakinuma | G07C 5/008 701/31.4 |
| 2015/0121285 A1* | 4/2015 | Eleftheriou | G06F 3/04842 715/773 |
| 2015/0378599 A1 | 12/2015 | Lee et al. | |
| 2016/0072944 A1* | 3/2016 | Noda | H04M 1/724 455/566 |
| 2017/0160882 A1 | 6/2017 | Park et al. | |

OTHER PUBLICATIONS

Bluetooth Keyboard, incubate touch pad—Youtube, https://youtu.be/XZ-fiurcV6w, Mar. 8, 2017.
European Search Report dated May 21, 2021, issued in European Application No. 19845545.3.

* cited by examiner

ELECTRONIC DEVICE AND METHOD FOR PROVIDING VIRTUAL INPUT TOOL

CROSS-REFERENCE TO RELATED APPLICATION(S)

This application is based on and claims priority under 35 U.S.C. § 119(a) of a Korean patent application number 10-2018-0090321, filed on Aug. 2, 2018, in the Korean Intellectual Property Office, the disclosure of which is incorporated by reference herein in its entirety.

BACKGROUND

1. Field

The disclosure relates to an electronic device for providing a virtual input tool and an operation method therefor.

2. Description of Related Art

As technologies have developed, use of portable terminals, such as tablets, phablets, smart phones, or the like has increased. In order to provide an intuitive interaction, the portable terminals may include touch screens.

The above information is presented as background information only to assist with an understanding of the disclosure. No determination has been made, and no assertion is made, as to whether any of the above might be applicable as prior art with regard to the disclosure.

SUMMARY

In order to provide interaction with an electronic device, various types of portable input tools (or auxiliary input devices), such as a wireless keyboard, a wireless mouse, or the like, have come into wide use. However, users generally carry portable terminals such as smart phones, tablets, phablets, or the like, and it is inconvenient for users to carry independent portable input tools.

Aspects of the disclosure are to address at least the above-mentioned problems and/or disadvantages and to provide at least the advantages described below. Accordingly, an aspect of the disclosure is to provide an apparatus and method for a solution that enables a user to use a portable terminal that the user generally carries as a portable input tool.

Additional aspects will be set forth in part in the description which follows and, in part, will be apparent from the description, or may be learned by practice of the presented embodiments.

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device is provided. The electronic device includes a communication circuitry, at least one memory storing instructions, a display, and at least one processor. The at least one processor, when executing the instructions, is configured to display, using the communication circuitry, a first user interface of an application currently executing in the electronic device on a display of an external device, while displaying the first user interface on the display of the external device, receive a specified input, and in response to receiving the specified input, display, on the display of the electronic device, a virtual touch pad in a first area and a virtual keyboard in a second area distinct from the first area.

In accordance with another aspect of the disclosure, a method of operating an electronic device is provided. The method includes displaying a first user interface of an application currently executing in the electronic device on a display of an external device, receiving a specified input, while displaying the first user interface on the display of the external device, and in response to receiving the specified input, displaying a virtual touch pad in a first area and displaying a virtual keyboard in a second area distinct from the first area, on a display of the electronic device.

In accordance with another aspect of the disclosure, a non-transitory computer readable storage medium storing a program is provided. The program, when executed by a processor of an electronic device, causes the electronic device to display a first user interface of an application currently executing in the electronic device on a display of another electronic device distinct from the electronic device, in response to receiving a specified input while displaying the first user interface on the display of the other device, display, on a display of the electronic device, a virtual touch pad in a first area and a virtual keyboard in a second area distinct from the first area.

An electronic device and an operation method therefor according to various embodiments may provide a virtual touch pad and thus provides enhanced portability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
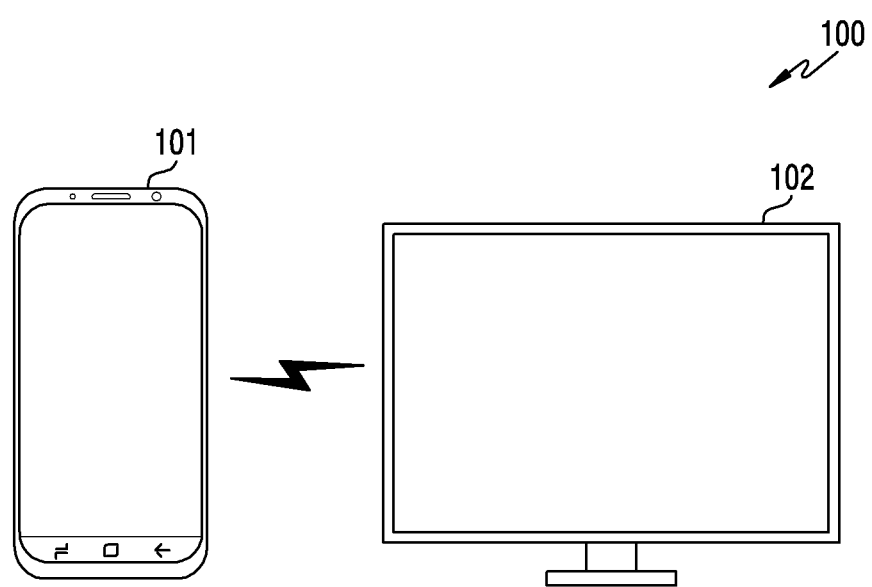
FIG. 1 is a diagram illustrating an example of an environment including an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expression "have," "may have," "include" or "may include" refers to existence of a corresponding feature (e.g., numerical value, function, operation, or components such as elements), and does not exclude existence of additional features.

In the disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for," "having the capability to," "designed to," "adapted to," "made to," or "capable of" The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to an embodiment may be a flexible electronic device or a foldable electronic device. Further, the electronic device according to an embodiment of the disclosure is not limited to the aforementioned devices, and may include a new electronic device according to the development of technology.

In the disclosure, the term "user" may indicate a person using an electronic device or a device (e.g., an artificial intelligence electronic device) using an electronic device.

Hereinafter, referring to the enclosed drawings, various embodiments will be described in detail. For ease of description, the sizes of elements may be scaled up or down in drawings. For example, the size and thickness of each element in drawings are merely illustrated for ease of description, and the disclosure is not always limited by the illustrations.

FIG. 1 is a diagram illustrating an example of an environment including an electronic device according to various embodiments of the disclosure.

Referring to FIG. 1, an environment 100 may include an electronic device 101 and an electronic device 102.

According to various embodiments, the electronic device 101 may be a portable terminal having a touch screen and a communication circuitry. For example, the electronic device 101 may be a tablet, a phablet, or a smart phone.

According to various embodiments, the electronic device 101 may communicate with the electronic device 102 by wire or wireless. According to various embodiments, the electronic device 101 may use various communication paths in order to communicate with the electronic device 102. For example, the electronic device 101 may communicate with the electronic device 102 via an indirect communication path configured with a communication path between the electronic device 101 and a relay entity (e.g., a base station, an access point (AP), or the like), and a communication path between the relay entity and the electronic device 102. According to another embodiment, the electronic device 101 may communicate with the electronic device 102 via a direct communication path between the electronic device 101 and the electronic device 102. However, the disclosure is not limited thereto.

According to various embodiments, the electronic device 101 may display a screen on a display of the electronic device 102, via communicate with the electronic device 102. According to various embodiment, the screen displayed on the display of the electronic device 102 may be the same as, or different from, a screen displayed on a display of the electronic device 101. For example, the screen displayed on the display of the electronic device 102 may provide a content, which corresponds to a content provided by the screen displayed on the display of the electronic device 101, in a configuration different from the configuration of the screen displayed on the display of the electronic device 101. As another example, the screen displayed on the display of the electronic device 102 may provide a content different from the content provided by the screen displayed on the display of the electronic device 101. As another example, the screen displayed on the display of the electronic device 102 may provide a content, which corresponds to the content provided by the screen displayed on the display of the electronic device 101, in a configuration corresponding to the configuration of the screen displayed on the display of the electronic device 101. However, the disclosure is not limited thereto.

According to various embodiments, the electronic device 101 may receive an input associated with the screen displayed on the display of the electronic device 102. According to various embodiments, in response to the input, the electronic device 101 may change a representation of the screen displayed on the display of the electronic device 102 via communicate with the electronic device 102.

According to various embodiments, the electronic device 102 may be a device capable of displaying a screen or capable of displaying a screen using an external device. According to various embodiments, the electronic device 102 may be a device capable of displaying a screen without communication with another electronic device (e.g., the electronic device 101). For example, the electronic device 102 may be a TV, a digital signage, a desktop computer, a laptop computer, a tablet, phablet, or a smart phone. According to various embodiments, the electronic device 102 may be a device capable of displaying a screen only by using communication with another electronic device (e.g., the electronic device 101). For example, the electronic device 102 may be a monitor or a beam projector.

According to various embodiments, the electronic device 102 may be a device capable of providing a screen in a size wider than the screen of the electronic device 101. However, the disclosure is not limited thereto.

Figure 2:
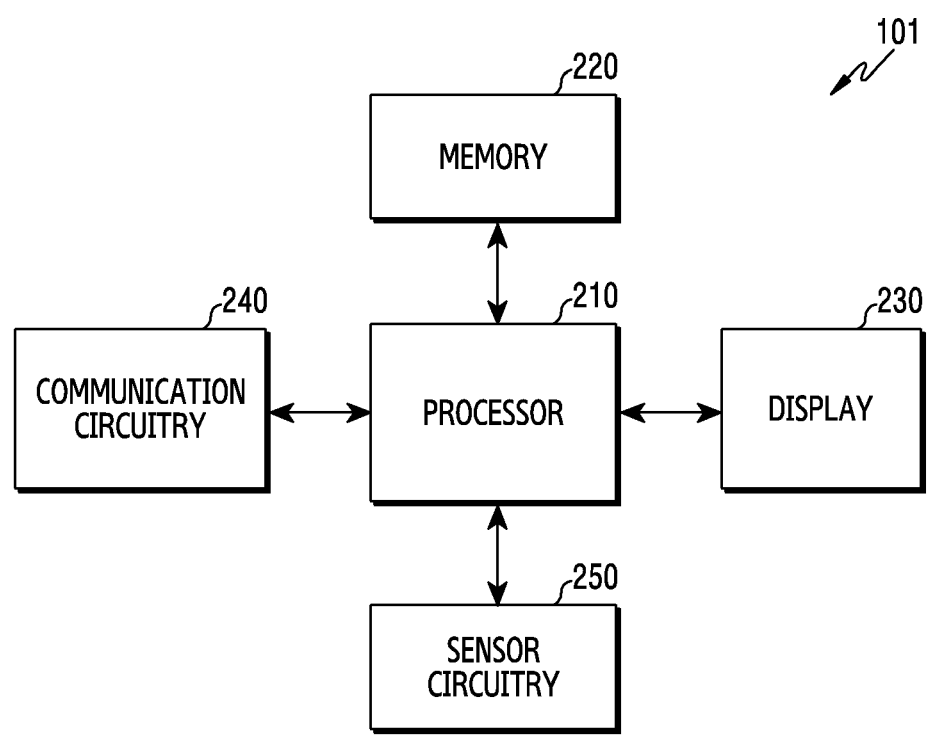
FIG. 2 is a diagram illustrating an example of the functional configuration of an electronic device according to various embodiments of the disclosure.

FIG. 2 is a diagram illustrating an example of the functional configuration of an electronic device according to various embodiments of the disclosure. The functional configuration may be included in the electronic device 101 of FIG. 1.

Referring to FIG. 2, the electronic device 101 may include a processor 210, a memory 220, a display 230, a communication circuitry 240, and a sensor circuitry 250.

The processor 210 may control the overall operation of the electronic device 101. For example, the processor 210 may execute applications that provide advertisements, the Internet, games, videos, or the like. According to various embodiments, the processor 210 may include a single processor core (single core), or may include multiple processor cores. For example, the processor 210 may include a multi-core such as a dual-core, a quad-core, a hexa-core, and the like. According to embodiments, the processor 210 may further include a cache memory that is located inside or outside the processor 210.

The processor 210 may receive commands from other elements of the electronic device 101, may interpret the received commands, and may execute computation or process data on the basis of the interpreted commands.

The processor 210 may process data or signals produced by an application. For example, the processor 210 may request instructions, data, or signals from the memory 220 so as to execute or control an application. The processor 210 may record (or store) or update instructions, data, or signals in the memory 220 so as to execute or control an application.

The processor 210 may interpret or process messages, data, instructions, or signals received from the memory 220, the display 230, the communication circuitry 240, or the sensor circuitry 250. Also, the processor 210 may produce new messages, data, instructions, or signals on the basis of received messages, data, instructions, or signals. The processor 210 may provide the processed or produced messages, data, instructions, or signals to the memory 220, the display 230, the communication circuitry 240, or the sensor circuitry 250.

A part or the whole of the processor 210 may be electrically or operably (or operatively) coupled with, or connected to, other elements of the electronic device 101 (e.g., the memory 220, the display 230, the communication circuitry 240, or the sensor circuitry 250).

According to embodiments, the processor 210 may be configured with one or more processors. For example, the processor 210 may include one or more processors from among an AP for controlling a program in a higher layer such as an application program or the like, a graphics processing unit (GPU) for controlling the display 230, or a communication processor (CP) for controlling the communication circuitry 240.

The memory 220 may store instructions for controlling the electronic device 101, control instruction codes, control data, or user data. For example, the memory 220 may include applications, an operating system (OS), middleware, and a device driver.

The memory 220 may include one or more from among volatile memory and non-volatile memory. The volatile memory may include a dynamic random access memory (DRAM), a static RAM (SRAM), a synchronous DRAM (SDRAM), a phrase-change RAM (PRAM), a magnetic RAM (MRAM), a resistive RAM (RRAM), a ferroelectric RAM (FeRAM), and the like. The non-volatile memory may include read only memory (ROM), programmable ROM (PROM), electrically programmable ROM (EPROM), electrically erasable ROM (EEPROM), flash memory.

The memory 220 may include a non-volatile medium, such as a hard disk drive (HDD), a solid state disk (SSD), an embedded multimedia card (eMMC), and a universal flash storage (UFS).

The display 230 may output contents, data, or signals. According to various embodiments, the display 230 may display image data processed by the processor 210.

According to various embodiments, the display 230 may be configured with an integrated touch screen by being coupled with a plurality of touch sensors (not illustrated) capable of receiving a touch input or the like. If the display 230 is configured with a touch screen, the plurality of touch sensors may be disposed on the display 230 or below the display 230.

According to various embodiments, the display 230 may be configured to be a display (e.g., a foldable display) at least a part of which is foldable. If the display 230 is configured to be a foldable display, the electronic device 101 may have a structure which allows the display 230 to be foldable.

The communication circuitry 240 may establish a wired or wireless communication channel between the electronic device 101 and an external electronic device (e.g., the electronic device 102), and may support communication via the established communication channel According to an embodiment, the communication circuitry 240 may include a wireless communication circuitry (e.g., a cellular communication circuitry, a short-range wireless communication circuitry, or a global navigation satellite system (GNSS) communication circuitry) or a wired communication circuitry (e.g., a local area network (LAN) communication circuitry or a power line communication circuitry), and may communicate with an external electronic device via a first network (e.g., a short-range communication network such as Bluetooth, Wi-Fi direct, or infrared data association (IrDA)) or a second network (e.g., a long-distance communication network such as a cellular network, the Internet, or a computer network (e.g., LAN or wide area network (WAN))) using a corresponding communication circuitry among the described communication circuitries. The above-described various types of communication circuitry 240 may be implemented by one chip or by separate chips.

According to an embodiment, the wireless communication circuitry may identify and authenticate the electronic device 101 within a communication network using user information stored in a subscriber identification module.

The sensor circuitry 250 may include a sensor for obtaining information associated with the posture of the electronic device 101.

According to various embodiments, the sensor circuitry 250 may include one or more sensors from among a sensor for obtaining data associated with a change in the linear movement of the electronic device 101, a sensor for obtaining data associated with a change in the rotational movement of the electronic device 101, a sensor for identifying whether the electronic device 101 is gripped by a user, or a sensor for obtaining data associated with geographical position of the electronic device 101. For example, the sensor circuitry 250 may include one or more from among a geomagnetic sensor, a gyro sensor, a proximity sensor, an acceleration sensor, an illumination sensor, and an infrared ray sensor.

According to various embodiments, the processor 210 may display a first user interface of an application being executed in the electronic device 101 on the display of the electronic device 102, using the communication circuitry 240. For example, the processor 210 may transmit frame data associated with the first user interface of the application or control information for displaying the first user interface of the application to the electronic device 102 using the communication circuitry 240.

According to various embodiments, while the first user interface of the application being executed in the electronic device 101 is displayed on the display of the electronic device 102 via the communication circuitry 240, the processor 210 may display, on the display 230, at least one virtual input tool capable of receiving an input to the first user interface. According to various embodiments, the at least one virtual input tool may display on the display, in order to provide interaction with the first user interface.

According to various embodiments, the at least one virtual input tool may be displayed in various arrangements or shapes on the display.

Figure 3A:
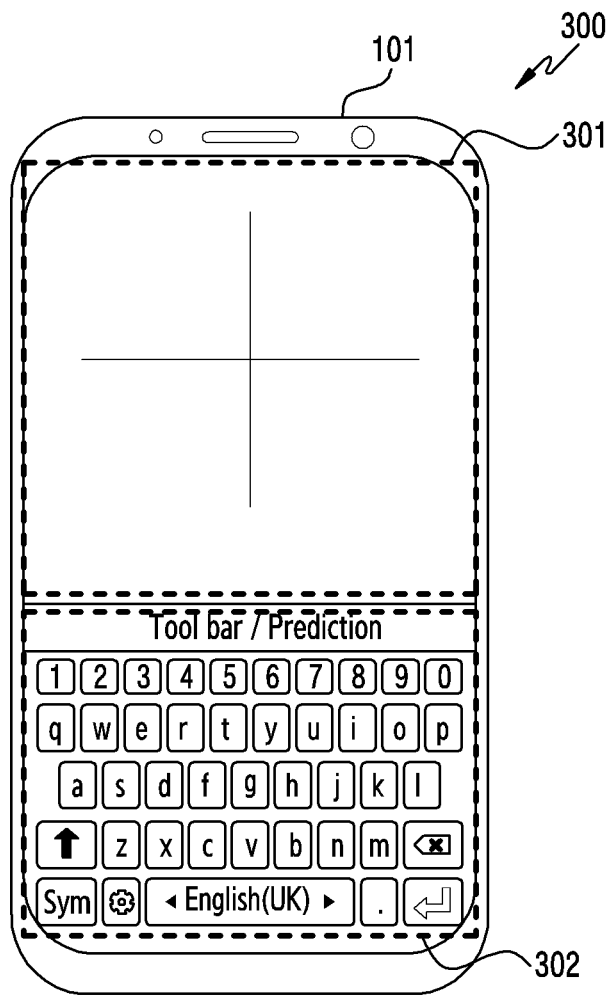
FIG. 3A is a diagram illustrating an example of a virtual input tool displayed in an electronic device according to various embodiments of the disclosure.

FIG. 3A is a diagram illustrating an example of a virtual input tool displayed in an electronic device according to various embodiments of the disclosure.

Referring to FIG. 3A, as shown in a state 300, while the first user interface of the application is displayed on the display of the electronic device 102 using the communication circuitry 240, the processor 210 may use the display 230, and may display a virtual touch pad in a first area 301 and a virtual keyboard in a second area 302. According to various embodiments, the virtual touch pad may provide a function of a mouse. For example, on the basis of an input (e.g., a drag input, a single-tap input, a multi-tap input, a depression input (e.g., force touch input), or the like) on an area displaying the virtual touch pad, the virtual touch pad may move a pointer, such as a cursor, on the first user interface, may perform scrolling, or may execute or move an executable object included in the first user interface. As another example, the virtual touch pad may be used to perform drawing or to input a handwritten character on the basis of the path of a drag input on the area displaying the virtual touch pad. According to various embodiments, the virtual keyboard may provide a function of a keyboard. For example, the virtual keyboard may be used to input, to the first user interface, at least one character indicated by at least one key on the basis of an input (e.g., a drag input, a single tap input, a multi-tap input, a depression input (e.g., force touch input), or the like) to at least one of a plurality of keys included in the virtual keyboard. However, the disclosure is not limited thereto.

According to various embodiments, the first area 301 may be separate or distinct from the second area 302. According to various embodiments, the first area 301 may be displayed to be spaced apart from the second area 302. For example, the first area 301 may be disposed above the second area 302. As another example, unlike FIG. 3A, the first area 301 may be disposed below the second area 302. However, the disclosure is not limited thereto.

Figure 3B:
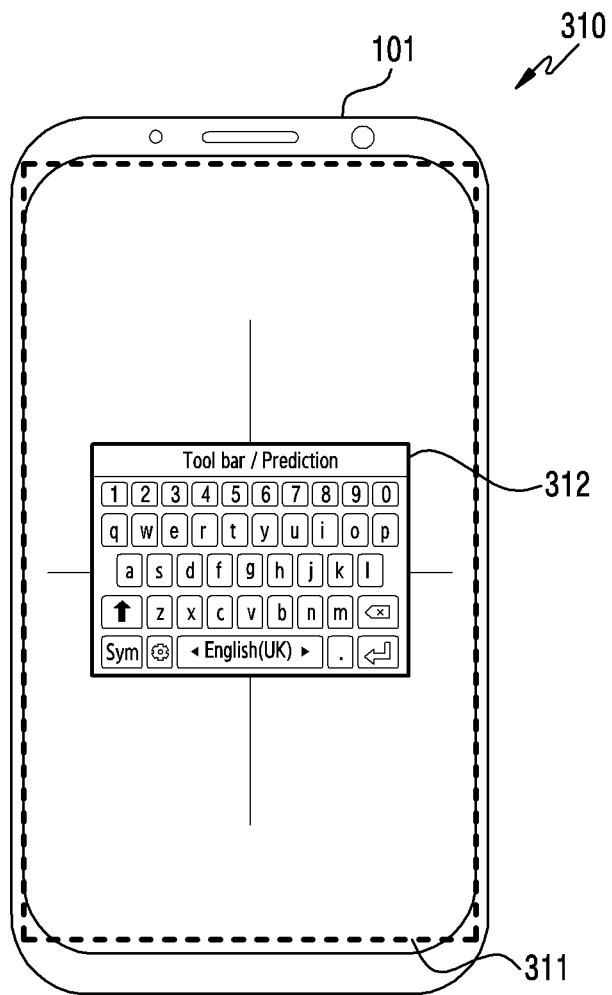
FIG. 3B is a diagram illustrating another example of a virtual input tool displayed in an electronic device according to various embodiments of the disclosure.

FIG. 3B is a diagram illustrating another example of a virtual input tool displayed in an electronic device according to various embodiments of the disclosure.

Referring to FIG. 3B, as shown in a state 310, while the first user interface of the application is displayed on the display of the electronic device 102 using the communication circuitry 240, the processor 210 may display the virtual touch pad in a first area 311, and may display the virtual keyboard in a second area 312 which is floated on or superimposed on the first area 311, using the display 230. According to various embodiments, the processor 210 may disable the virtual keyboard displayed in the second area 312, in response to receiving an input on the virtual touch pad displayed in the first area 311. The fact that the virtual keyboard is disabled indicates that the input is not recognized as an input to the virtual keyboard even though the input moves across over any one of the plurality of keys included in the virtual keyboard. According to various embodiments, the processor 210 may enable the disabled virtual keyboard in response to identifying that the input is released or identifying that a specified period of time elapses after the input is released. According to various embodiments, the processor 210 may disable the virtual touch pad displayed in the first area 311 in response to receiving an input on the virtual keyboard displayed in the second area 312. The fact that the virtual touch pad is disabled may indicate that the input on the virtual touch pad is not recognized even though the input moves across any area of the virtual touch pad. According to various embodiments, the processor 210 may enable the disabled virtual touch pad in response to identifying that the input is released or identifying that a specified period of time elapses after the input is released.

Figure 3C:
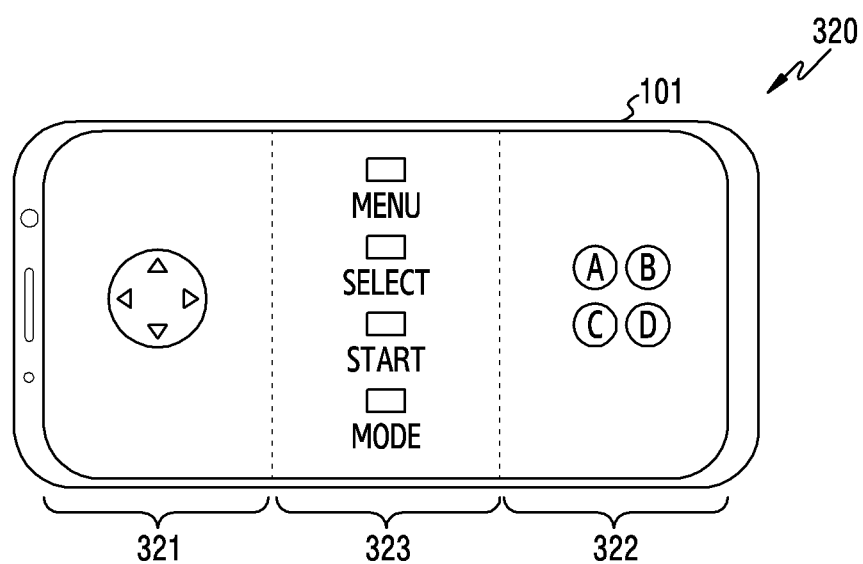
FIG. 3C is a diagram illustrating another example of a virtual input tool displayed in an electronic device according to various embodiments of the disclosure.

FIG. 3C is a diagram illustrating another example of a virtual input tool displayed in an electronic device according to various embodiments of the disclosure.

Referring to FIG. 3C, as shown in a state 320, while the first user interface of the application is displayed on the display of the electronic device 102 using the communication circuitry 240, the processor 210 may use the display 230, so as to display a first part of a virtual joy pad in a first area 321, display a second part of the virtual joy pad in a second area 322, and display a remaining part of the virtual joy pad in a third area 323 located between the first area 321 and the second area 322. According to various embodiments, on the basis of identifying that a game application is being executed in the electronic device 101 and a user interface of the game application is displayed on the display of the electronic device 102 using the communication circuitry 240, the processor 210 may display the first part of the virtual joy pad in the first area 321, may display the second part of the virtual joy pad in the second area 322, and may display the remaining part of the virtual joy pad in the third area 323, using the display 230. According to various embodiments, the first part of the virtual joy pad may include executable objects for orientation control. For example, a first object among the executable objects for orientation control is used to move a game character provided by the game application in first direction. A second object among the executable objects for orientation control is used to move the game character in a second direction which is opposite to the first direction. A third object among the executable objects for orientation control is used to move the game character in a third direction. A fourth object among the executable objects for orientation control is used to move the game character in a fourth direction. According to various embodiments, the second part of the virtual joy pad may include executable objects for controlling actions of the game character. For example, a first object among the executable objects included in the second part may be used to perform a first action of the game character. A second object among the executable objects included in the second part may be used to perform a second action of the game character. A third object of the executable objects included in the second part may be used to perform a third action of the game character. A fourth object of the executable objects included in the second part may be used to perform a fourth action of the game character. According to various embodiments, the remaining part of the virtual joy pad may include executable objects for controlling various settings for the game. For example, a first object among the executable objects included in the remaining part may be used to change the virtual joy pad to the virtual keyboard or virtual keypad illustrated in FIG. 3A or 3B. A second object among the executable objects included in the remaining part may be used to display a menu provided from the game in the user interface of the game application displayed on the display of the electronic device 102. A third object among the executable objects included in the remaining part may be used to pause the game. A fourth object among the executable objects included in the remaining part may be used to determine a mode of the game. However, the disclosure is not limited thereto.

Figure 3D:
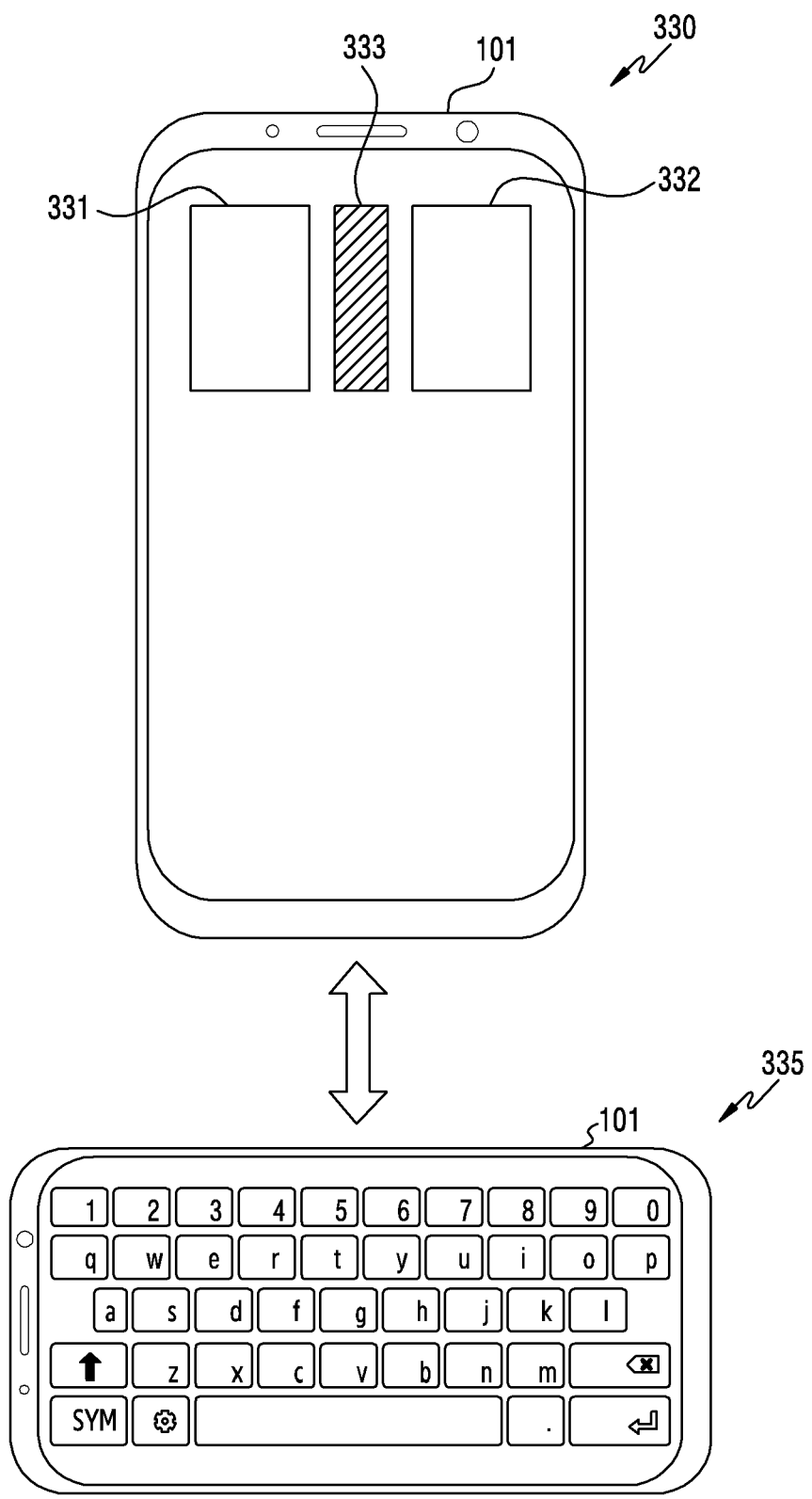
FIG. 3D is a diagram illustrating another example of a virtual input tool displayed in an electronic device according to various embodiments of the disclosure.

FIG. 3D is a diagram illustrating another example of a virtual input tool displayed in an electronic device according to various embodiments of the disclosure.

Referring to FIG. 3D, as shown in a state 330, while the first user interface of the application is displayed on the display of the electronic device 102 using the communication circuitry 240, the processor 210 may display, using the display 230, executable objects respectively corresponding to functions included in a mouse. For example, a first object 331 among the executable objects may correspond to the function of the left button of the mouse, a second object 332 among the executable objects may correspond to the function of the right button of the mouse, and a third object 333 among the executable objects may correspond to a rotatable structure (e.g., a wheel) of the mouse. According to various embodiments, the processor 210 may change the location of a pointer in the first user interface of the application displayed on the display of the electronic device 102, on the basis of information associated with a change of the position of the electronic device 101 obtained using the sensor circuitry 250. According to various embodiments, while the first user interface of the application is displayed on the display of the electronic device 102 using the communication circuitry 240, the processor 210 may display, using the display 230, executable objects respectively corresponding to functions included in the mouse, on the basis of identifying that the electronic device 101 is in the portrait state, using the sensor circuitry 250. According to various embodiments, while displaying the executable objects respectively corresponding to the functions include in the mouse, the processor 210 may enable touch sensors disposed on or below an area that displays the executable objects among a plurality of touch sensors disposed on or below the display 230, and may disable the remaining touch sensors of the plurality of touch sensors. According to various embodiments, while the first user interface of the application is displayed on the display of the electronic device 102 using the communication circuitry 240, the processor 210 may change the state 330 to a state 335 on the basis of identifying that the electronic device 101 has been changed from the portrait state to the landscape state, using the sensor circuitry 250. According to various embodiments, the state 335 may indicate a state of displaying a virtual keyboard. In the state 335, on the basis of receiving an input to at least one key of a plurality of keys included in the virtual keyboard, the processor 210 may execute a function corresponding to the at least one key in the first user interface of the application displayed on the display of the electronic device 102 using the communication circuitry 240. However, the disclosure is not limited thereto.

According to various embodiments, while the first user interface of the application is displayed on the display of the electronic device 102 using the communication circuitry 240, the processor 210 may display a virtual input tool illustrated in FIGS. 3A, 3B, 3C, and 3D on the display 230 in response to receiving a specified input via the electronic device 101 or the electronic device 102. According to various embodiments, the virtual input tool may be changed from another screen which has been displayed using the display 230 before the specified input is received. According to various embodiments, the other screen may be the same as, or different from, the screen (e.g., the first user interface) displayed on the display of the electronic device 102. For example, the other screen may provide a content corresponding to a content provided by the screen displayed on the display of the electronic device 102, and may have a configuration corresponding to the configuration (e.g., the arrangement of objects) of the screen displayed on the display of the electronic device 102. For example, the other screen may be a reduced screen of the screen displayed on the display of the electronic device 102. As another example, the other screen may provide a content corresponding to the content provided by the screen displayed on the display of the electronic device 102, and may have a configuration distinct from the configuration of the screen displayed on the display of the electronic device 102. As another example, the other screen may provide a content distinct from the content provided by the screen displayed on the display of the electronic device 102. For example, the other screen may be a user interface of another application distinct from the application. However, the disclosure is not limited thereto.

According to various embodiments, the specified input may be provided in any one of the various formats.

Figure 4A:
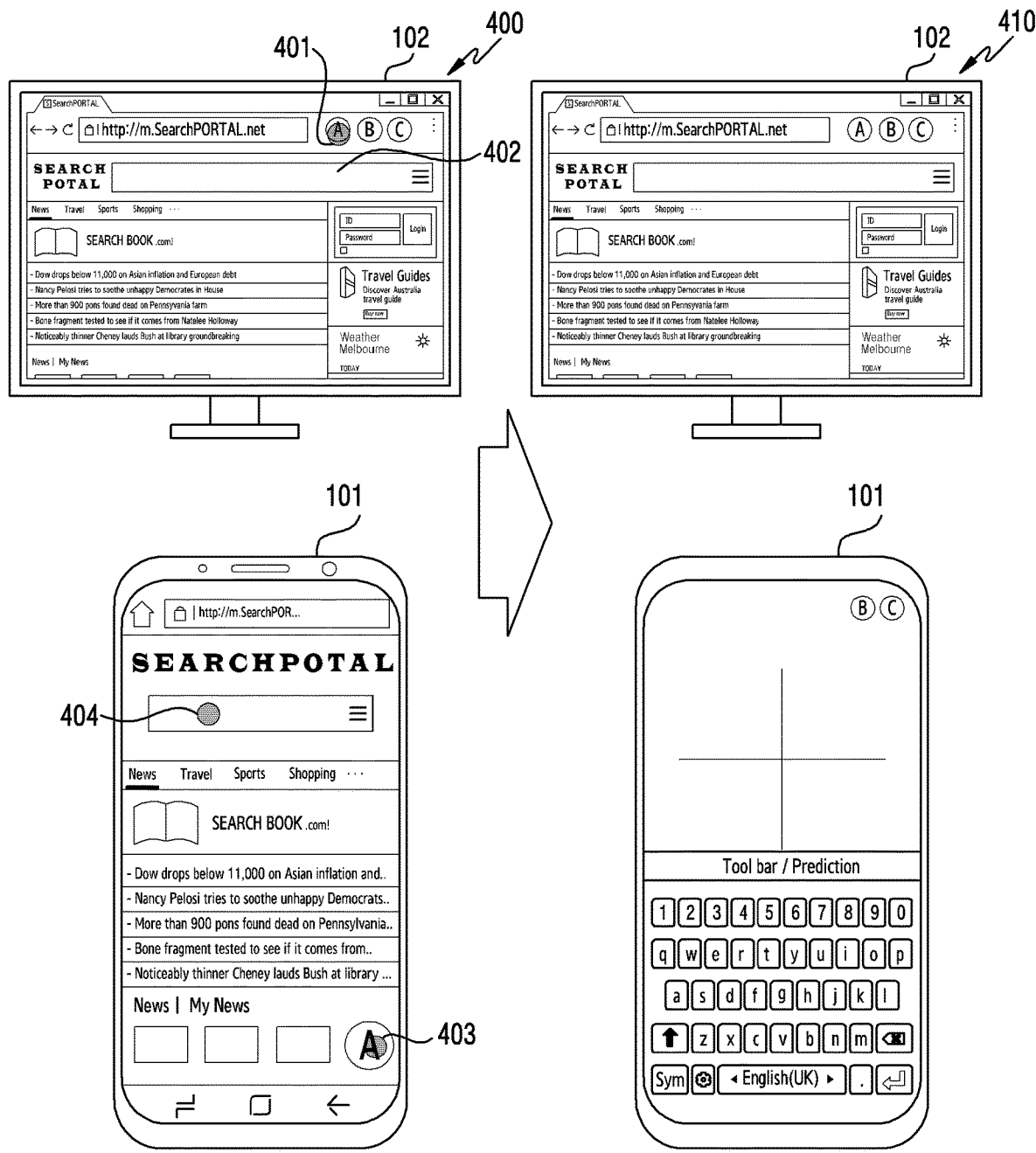
FIG. 4A is a diagram illustrating an example of a specified input which is used for displaying a virtual input tool according to various embodiments of the disclosure.

FIG. 4A is a diagram illustrating an example of a specified input which is used for displaying a virtual input tool according to various embodiments of the disclosure.

Referring to FIG. 4A, the processor 210 may display a second user interface of the application using the display 230, while displaying the first user interface of the application on the display of the electronic device 102, as shown in a state 400. According to various embodiments, the configuration of the second user interface may be different from the configuration of the first user interface.

According to various embodiments, in the state 400, the processor 210 may identify that the specified input on a specified object 401 included in the first user interface displayed on the display of the electronic device 102 is received, using the communication circuitry 240. According to various embodiments, the specified object 401 may be included in the first user interface, in order to call the virtual input tool in the display 230. According to various embodiments, the processor 210 may switch or change the state 400 to a state 410 in response to the identification. According to various embodiments, the state 410 may indicate a state of displaying the virtual input tool which is changed from the second user interface. For example, in the state 410, the processor 210 may display the virtual touch pad and the virtual keyboard, which are changed from the second user interface, on the display 230. According to various embodiments, in the state 410, the processor 210 may maintain the first user interface being displayed on the display of the electronic device 102, independently from identifying the specified input or in regardless of the specified input.

According to various embodiments, in the state 400, the processor 210 may identify that the specified input on a text input portion 402 included in the first user interface displayed on the display of the electronic device 102 is received, using the communication circuitry 240. According to various embodiments, the text input portion 402 may indicate an area capable of receiving a user input for inputting a character. According to various embodiments, the processor 210 may switch or change the state 400 to the state 410 in response to the identification. For example, in the state 410, the processor 210 may display the virtual touch pad and the virtual keyboard, which are changed from the second user interface, on the display 230. According to various embodiments, in the state 410, the processor 210 may maintain the first user interface being displayed on the display of the electronic device 102, independently from identifying the specified input or in regardless of the specified input.

According to various embodiments, the processor 210 may receive the specified input on a specified object 403 included in the second user interface displayed on the display in the state 400. According to various embodiments, the specified object 403 may be included in the second user interface, in order to call the virtual input tool in the display 230. According to various embodiments, the processor 210 may change the state 400 to the state 410 in response to receiving of the specified input on the specified object 403. For example, the processor 210 may display the virtual touch pad and the virtual keyboard, which are changed from the second user interface, on the display 230 in the state 410. According to various embodiments, the processor 210 may maintain the first user interface being displayed on the display of the electronic device 102, independently from receiving of the specified input in the state 410.

According to various embodiments, the processor 210 may receive the specified input on a text input portion 404 included in the second user interface displayed on the display in the state 400. According to various embodiments, the text input portion 404 may indicate an area capable of receiving a user input for inputting a character. According to various embodiments, the processor 210 may change the state 400 to the state 410 in response to receiving of the specified input on the text input portion 404. For example, the processor 210 may display the virtual touch pad and the virtual keyboard, which are changed from the second user interface, on the display 230 in the state 410. According to various embodiments, the processor 210 may maintain the first user interface being displayed on the display of the electronic device 102, independently from receiving of the specified input in the state 410.

According to various embodiments, the processor 210 may further display at least one object (e.g., object B or object C) for executing at least one application in the electronic device 101, the at least one application being distinct from the application that provides the first user interface, using the communication circuitry 240 in the first user interface in the state 410. According to various embodiments, the processor 210 may further display at least one object (e.g., object B or object C) for executing at least one application in the electronic device 101, using the display 230 in the second user interface in the state 410. According to various embodiments, the processor 210 may execute another application indicated by the at least one object in the electronic device 101 in response to receiving of an input on the at least one object included in the first user interface or an input on the at least one object included in the second user interface. In response to the execution, the processor 210 may display a user interface of the other application, which is changed from the first application, on the display of the electronic device 102 using the communication circuitry 240. However, the disclosure is not limited thereto.

Figure 4B:
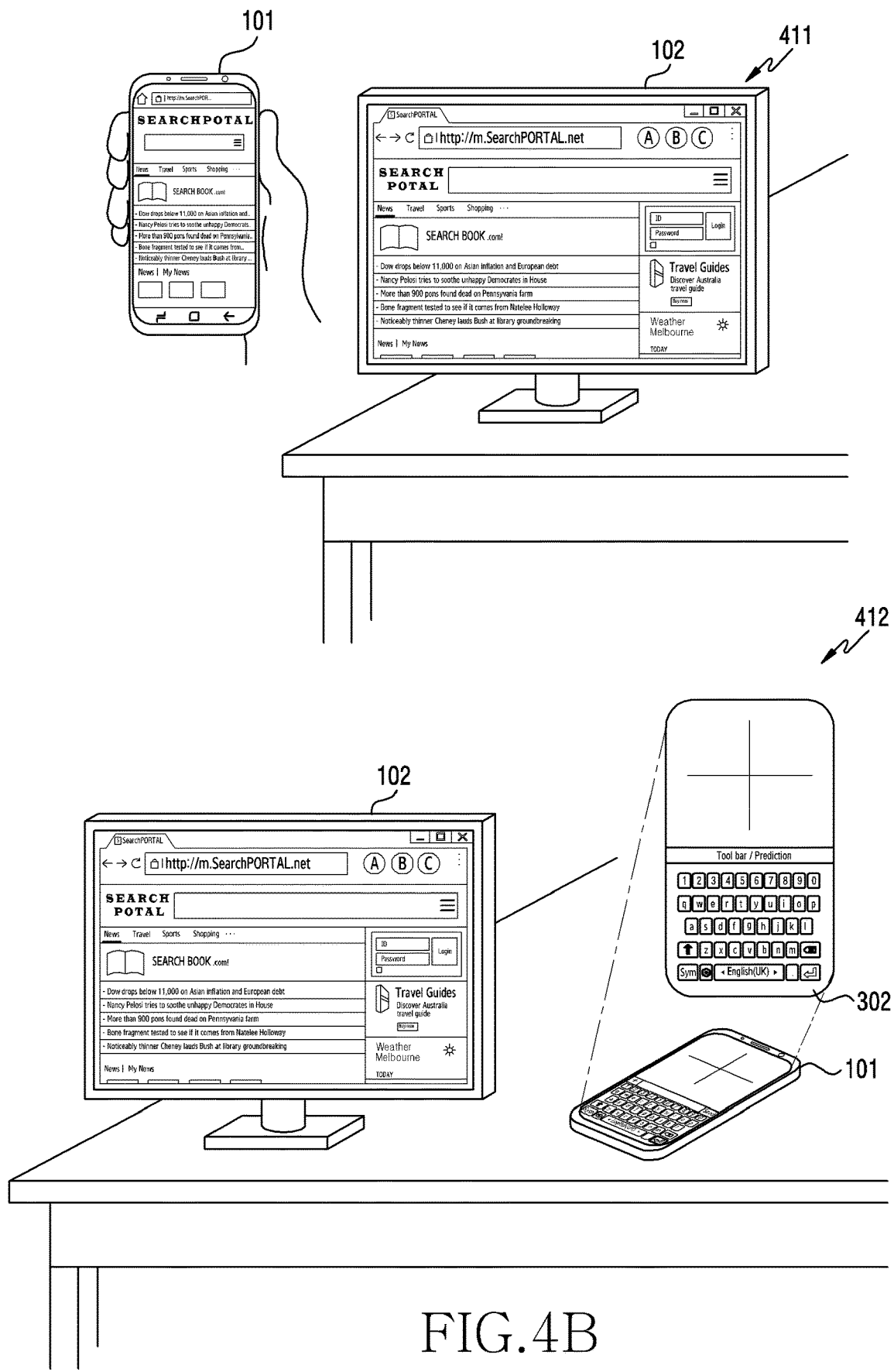
FIG. 4B is a diagram illustrating another example of a specified input which is used for displaying a virtual input tool according to various embodiments of the disclosure.

FIG. 4B is a diagram illustrating another example of a specified input which is used for displaying a virtual input tool according to various embodiments of the disclosure.

Referring to FIG. 4B, as shown in the state 411, while the first user interface of the application is displayed on the display of the electronic device 102, the processor 210 may identify, using the sensor circuitry 250, that the electronic device 101 is gripped by a user. According to various embodiments, on the basis of the identification, the processor 210 may display the second user interface of the application using the display 230 in the state 411. According to various embodiments, the processor 210 may identify that the electronic device 101 is changed from the state 411 to a state 412, using the sensor circuitry 250. According to various embodiments, the state 412 may be the state in which the processor 210 identifies that the user's gripping of the electronic device 101 is released, using the sensor circuitry 250. For example, the state 412 may indicate that the electronic device 101 is put on the table. According to various embodiments, the processor 210 may display the virtual touch pad and the virtual keyboard, which are changed from the second user interface, on the display 230 in response to changing to the state 412. According to various embodiments, the processor 210 may maintain the first user interface being displayed on the display of the electronic device 102, independently from changing to the state 412.

Figure 4C:
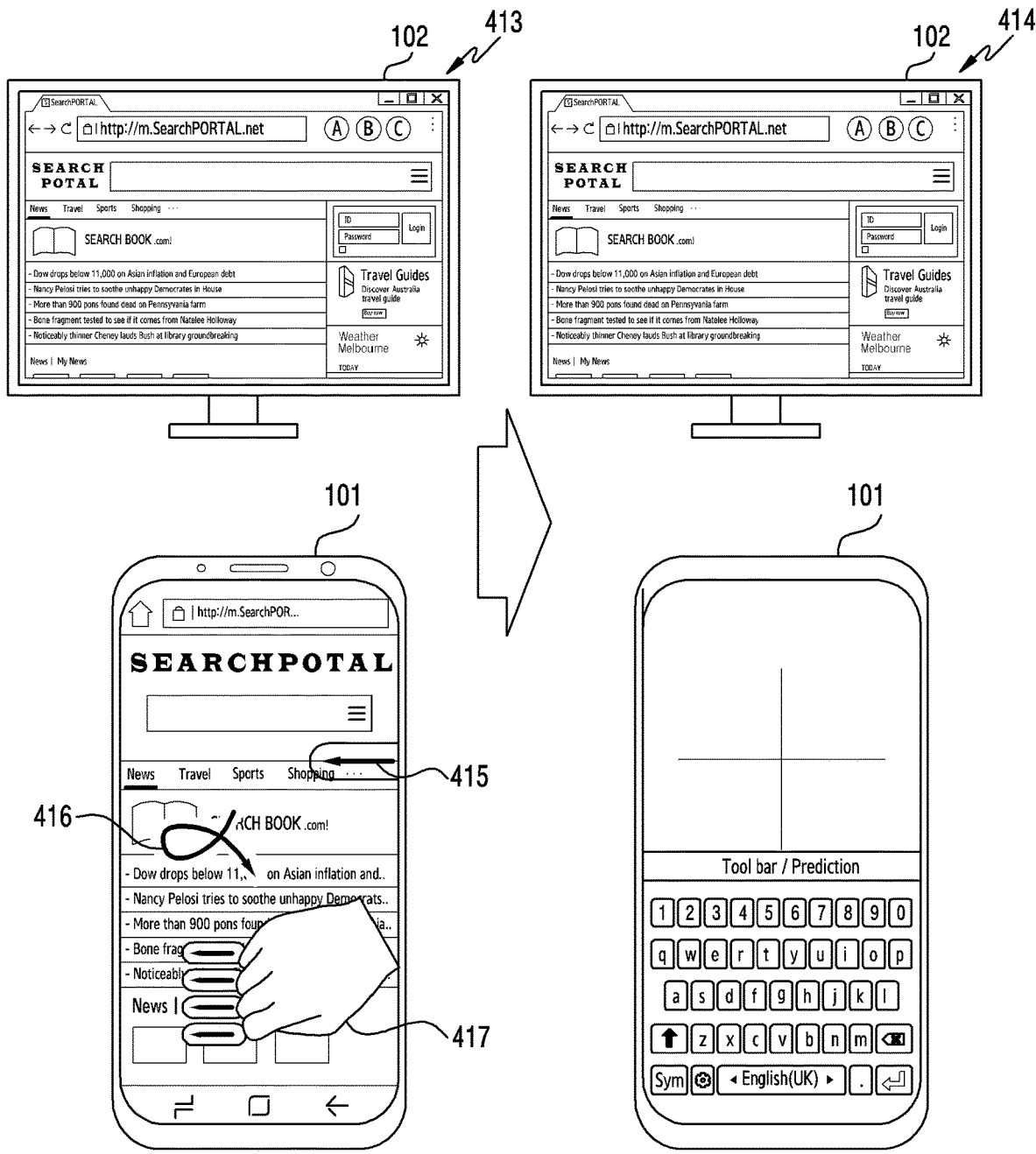
FIG. 4C is a diagram illustrating another example of a specified input which is used for displaying a virtual input tool according to various embodiments of the disclosure.

FIG. 4C is a diagram illustrating another example of a specified input which is used for displaying a virtual input tool according to various embodiments of the disclosure.

Referring to FIG. 4C, while the first user interface of the application is displayed on the display of the electronic device 102, as shown in the state 413, the processor 210 may receive the specified input having a specified attribute (or a specified type) via the second user interface displayed using the display 230. According to various embodiments, the processor 210 may change the state 413 to a state 414 in response to receiving of the specified input having the specified attribute on the second user interface. According to various embodiments, the state 414 may indicate a state of displaying the virtual input tool which is changed from the second user interface. For example, the processor 210 may change the state 413 to a state 414, in response to receiving of a drag input 415 directed from an edge area of the second user interface toward another area (e.g., the center area) of the second user interface as the specified input having the specified attribute in the state 413. As another example, the processor 210 may change the state 413 to the state 414, in response to receiving of a drag input 416 having a specified pattern on the second user interface as the specified input having the specified attribute in the state 413. As another example, the processor 210 may change the state 413 to the state 414 in response to receiving of a knuckle input 417 on the second user interface as the specified input having the specified attribute in the state 413. However, the disclosure is not limited thereto. According to various embodiments, the processor 210 may maintain the first user interface that is displayed on the display of the electronic device 102, independently from receiving of the specified input in the state 414.

Figure 4D:
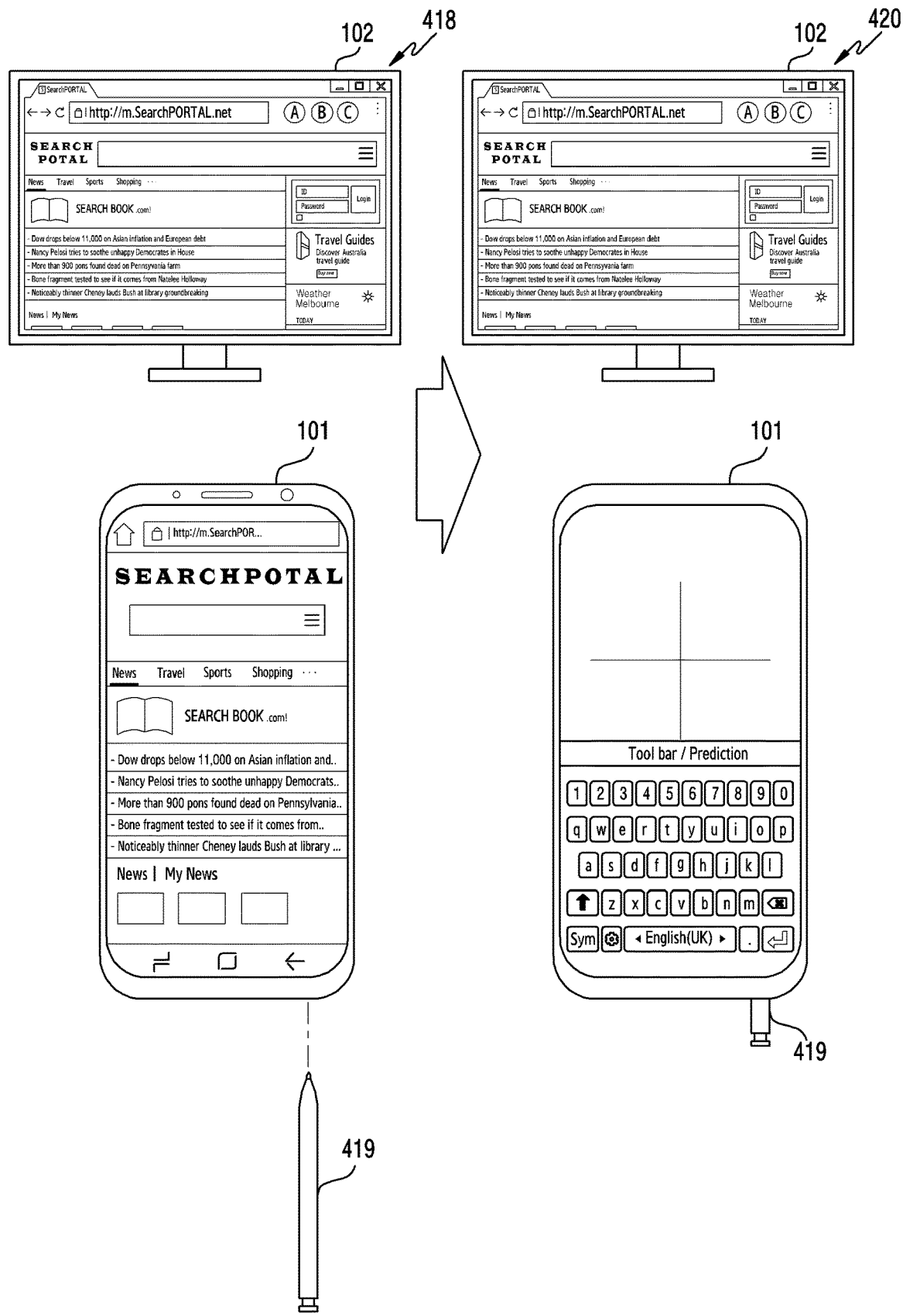
FIG. 4D is a diagram illustrating another example of a specified input which is used for displaying a virtual input tool according to various embodiments of the disclosure.

FIG. 4D is a diagram illustrating another example of a specified input which is used for displaying a virtual input tool according to various embodiments of the disclosure.

Referring to FIG. 4D, while the first user interface of the application is displayed on the display of the electronic device 102, the electronic device 101 may be in a state 418 in which a stylus 419 is separated from the electronic device 101, the stylus 419 being attachable to the electronic device 101 or being insertable into the electronic device 101. According to various embodiments, the processor 210 may display the second user interface using the display 230 in the state 418. According to various embodiments, in the state 418, if the stylus 419 which is separated from the electronic device 101 is attached to the electronic device 101 or is inserted into the electronic device 101, the processor 210 may identify the attachment or insertion to be the specified input. According to various embodiments, the processor 210 may change the state 418 to a state 420 in response to the identification. According to various embodiments, the state 420 may indicate a state of displaying the virtual input tool (e.g., the virtual touch pad and the virtual keyboard) changed from the second user interface. According to various embodiments, the processor 210 may maintain the first user interface being displayed on the display of the electronic device 102, independently from changing to the state 420.

Figure 4E:
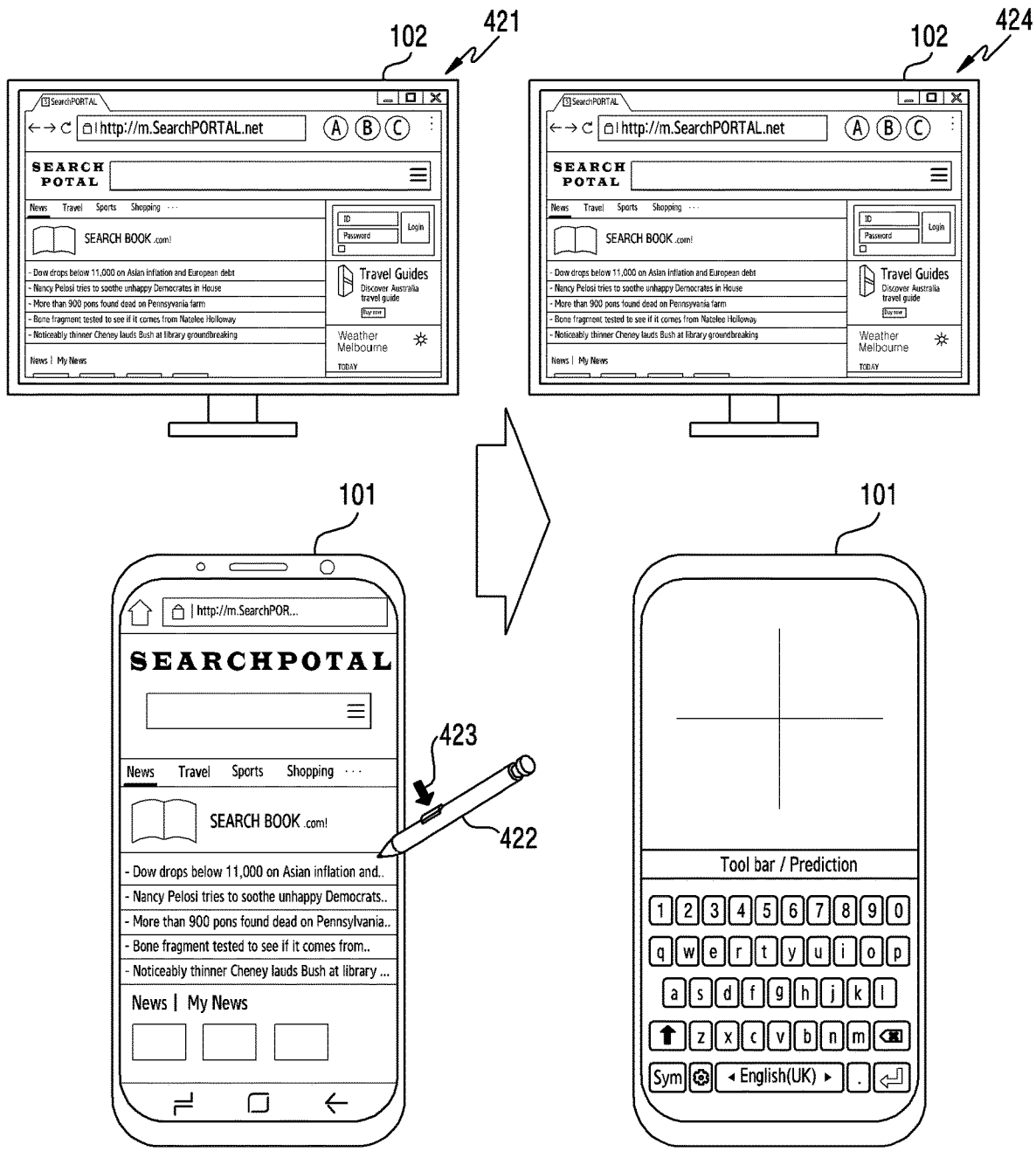
FIG. 4E is a diagram illustrating another example of a specified input which is used for displaying a virtual input tool according to various embodiments of the disclosure.

FIG. 4E is a diagram illustrating another example of a specified input which is used for displaying a virtual input tool according to various embodiments of the disclosure.

Referring to FIG. 4E, while the first user interface of the application is displayed on the display of the electronic device 102, the processor 210 may display the second user interface using the display 230 as shown in a state 421. According to various embodiments, in the state 421, the processor 210 may identify that an input 423 on a physical button of the stylus 422 related to the electronic device 101 is received as the specified input. According to various embodiments, the processor 210 may change the state 421 to a state 424 in response to the identification. According to various embodiments, the state 424 may indicate a state of displaying the virtual input tool (e.g., the virtual touch pad and the virtual keyboard) changed from the second user interface. According to various embodiments, the processor 210 may maintain the first user interface being displayed on the display of the electronic device 102, independently from the identification.

According to various embodiments, the processor 210 may receive a user input on the virtual input tool while displaying the virtual input tool using the display 230. According to various embodiments, the processor 210 may change or switch the state of at least a part of the virtual input tool in response to receiving of the user input.

Figure 5A:
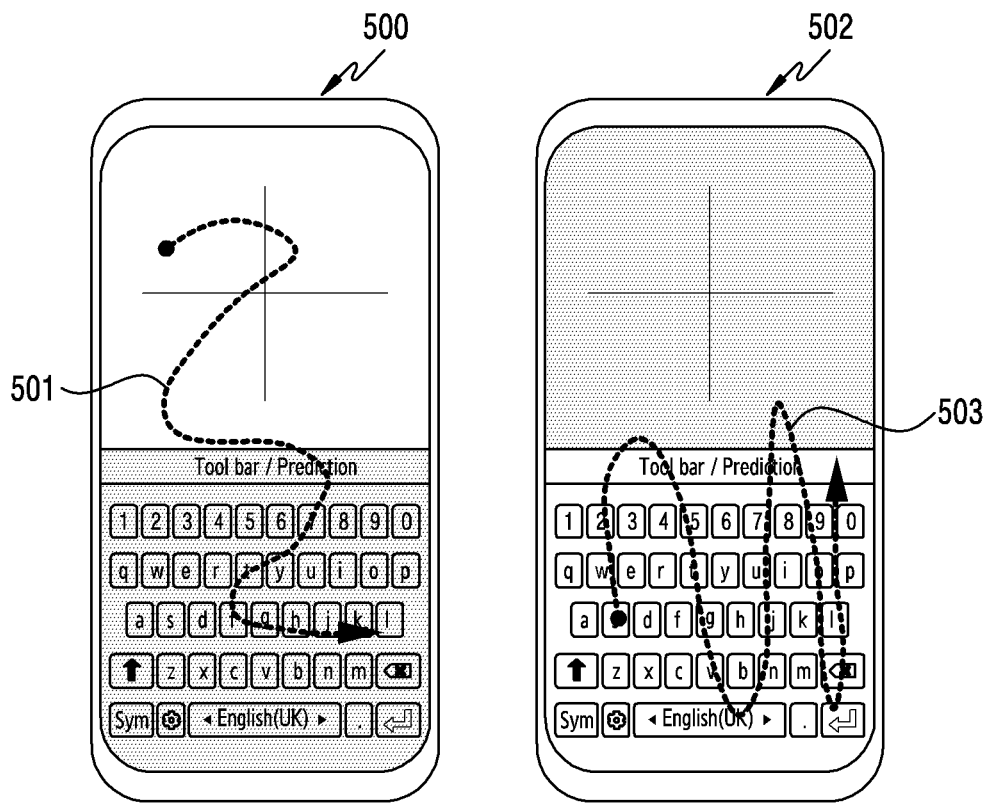
FIG. 5A is a diagram illustrating an example of a representation of a virtual input tool that varies according to various embodiments of the disclosure.

FIG. 5A is a diagram illustrating an example of a representation of a virtual input tool that varies according to various embodiments of the disclosure.

Referring to FIG. 5A, the processor 210 may display the virtual touch pad in a first area and may display the virtual keyboard in a second area, using the display 230 in a state 500. Although not illustrated in FIG. 5A, according to various embodiments, the processor 210 may display the first user interface on the display of the electronic device 102 using the communication circuitry 240 in the state 500. According to various embodiments, the processor 210 may receive an input 501 directed from the first area toward the second area in the state 500. According to various embodiments, in the state 500, the processor 210 may disable the virtual keyboard displayed in the second area distinct from the first area, on the basis of identifying that the input 501 is initiated from the first area. For example, while contact of the input 501 is maintained on the display, the processor 210 may recognize the path of the input 501 that moves across over any one of a plurality of keys included in the virtual keyboard, as a part of an input on the virtual touch pad, instead of an input on the virtual keyboard. The processor 210 may change a representation of the first user interface which is being displayed on the display of the electronic device 102, using the communication circuitry 240 on the basis of the recognition.

According to various embodiments, the processor 210 may maintain the virtual keyboard in the disabled state while the input 501 is maintained on the display in the state 500. According to various embodiments, the processor 210 may identify whether another input subsequent to the input 501 is received via the first area, until a specified period of time elapses from a timing at which release of the input 501 is identified. According to various embodiments, the processor 210 may enable the disabled virtual keyboard, on the basis of identifying that another input is not received via the first area until the specified period of time elapses from the timing at which release of the input 501 is identified.

According to various embodiments, while the virtual keyboard is disabled in the state 500, the processor 210 may use the display 230 so as to display a representation for indicating that the virtual keyboard is disabled. For example, while the virtual keyboard is disabled in the state 500, the processor 210 may dim or blur the virtual keyboard as a representation for indicating that the virtual keyboard is disabled, or may display a translucent layer over the virtual keyboard as a representation indicating that the virtual keyboard is disabled.

As another example, referring to FIG. 5A, the processor 210 may display the virtual touch pad in a first area and display the virtual keyboard in a second area, using the display 230 in a state 502. Although not illustrated in FIG. 5A, according to various embodiments, the processor 210 may display the first user interface on the display of the electronic device 102 using the communication circuitry 240 in the state 502. According to various embodiments, the processor 210 may receive an input 503 directed from the second area toward the first area in the state 502. According to various embodiments, in the state 502, the processor 210 may disable the virtual touch pad displayed in the first area distinct from the second area, on the basis of identifying that the input 503 is initiated from the second area. For example, while contact of the input 503 is maintained on the display, the processor 210 may ignore or discard the path of the input 503 that moves across over at least a part of the first area displaying the virtual touch pad, instead of processing the path of the input 503 as an input on the virtual touch pad. On the basis of ignoring, the processor 210 may change a representation of the first user interface being displayed on the display of the electronic device 102, using only a key input on at least a part of the plurality of keys included in the virtual keyboard, which is caused by the input 503.

According to various embodiments, the processor 210 may maintain the virtual touch pad in the disabled state while the input 503 is maintained on the display in the state 502. According to various embodiments, the processor 210 may enable the disabled virtual touch pad in response to identifying that the input 503 is released. According to various embodiments, the processor 210 may identify whether another input subsequent to the input 503 is received via the second area, until a specified period of time elapses from the timing at which release of the input 503 is identified. According to various embodiments, the processor 210 may enable the disabled virtual touch pad, on the basis of identifying that another input is not received via the second area until the specified period of time elapses after the timing at which release of the input 503 is identified.

According to various embodiments, while the virtual touch pad is disabled in the state 502, the processor 210 may display, using the display 230, a representation for indicating that the virtual touch pad is disabled. For example, while the virtual touch pad is disabled in the state 502, the processor 210 may blur the virtual touch pad as a representation indicating that the virtual touch pad is disabled, or may display a translucent layer over the virtual touch pad as a representation indicating that the virtual touch pad is disabled.

Figure 5B:
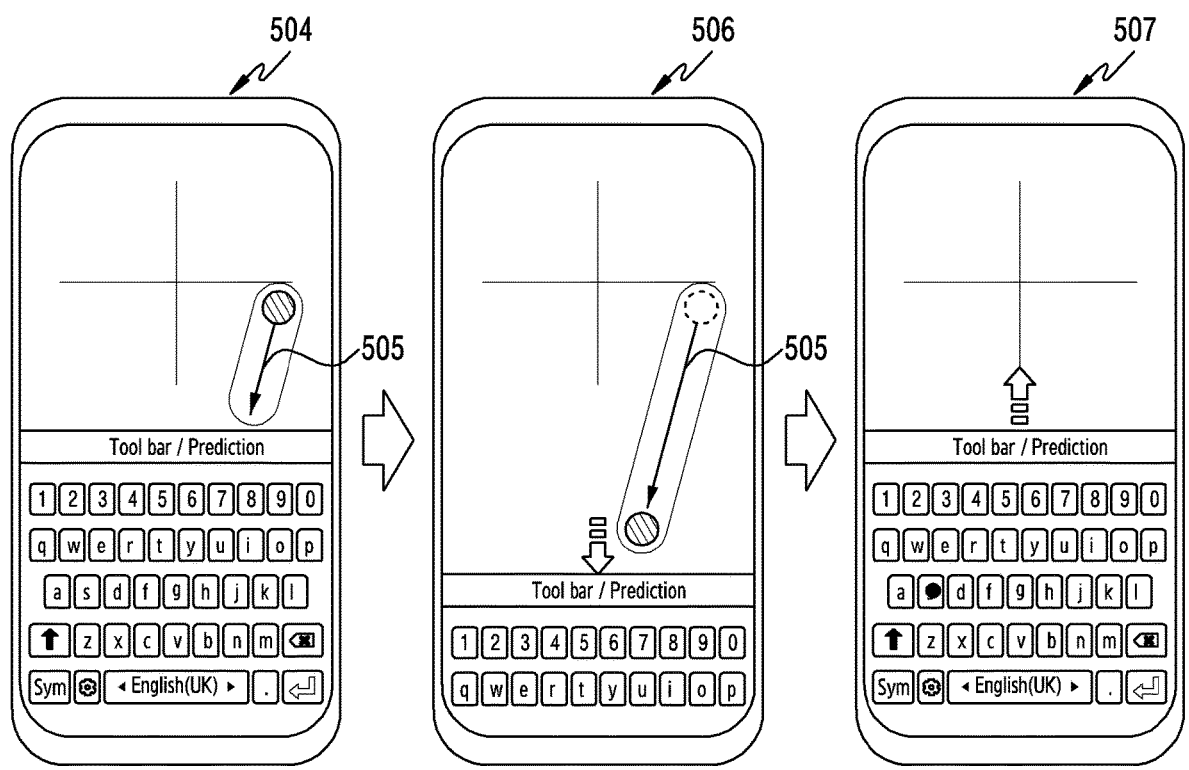
FIG. 5B is a diagram illustrating another example of a representation of a virtual input tool that varies according to various embodiments of the disclosure.

FIG. 5B is a diagram illustrating another example of a representation of a virtual input tool that varies according to various embodiments of the disclosure.

Referring to FIG. 5B, the processor 210 may display the virtual touch pad in a first area and may display the virtual keyboard in a second area, using the display 230 in a state 504. Although not illustrated in FIG. 5B, according to various embodiments, the processor 210 may display the first user interface on the display of the electronic device 102 using the communication circuitry 240 in the state 504. According to various embodiments, the processor 210 may receive a drag input 505 initiated from the first area in the state 504. According to various embodiments, in response to identifying that the drag input 505 directed from the first area toward the second area displaying the virtual key board, the processor 210 may change a representation of the virtual keyboard in order to avoid contact between the drag input 505 and the virtual keyboard as shown in a state 506 which is changed from the state 504. For example, in the state 506, the processor 210 may move the virtual keyboard below the drag input 505 using the display 230 so as to avoid contact between the drag input 505 and the virtual keyboard. According to various embodiments, the processor 210 may restore the previous representation of the virtual keyboard in response to identifying that the drag input 505 is released, as shown in a state 507 changed from the state 506.

Figure 5C:
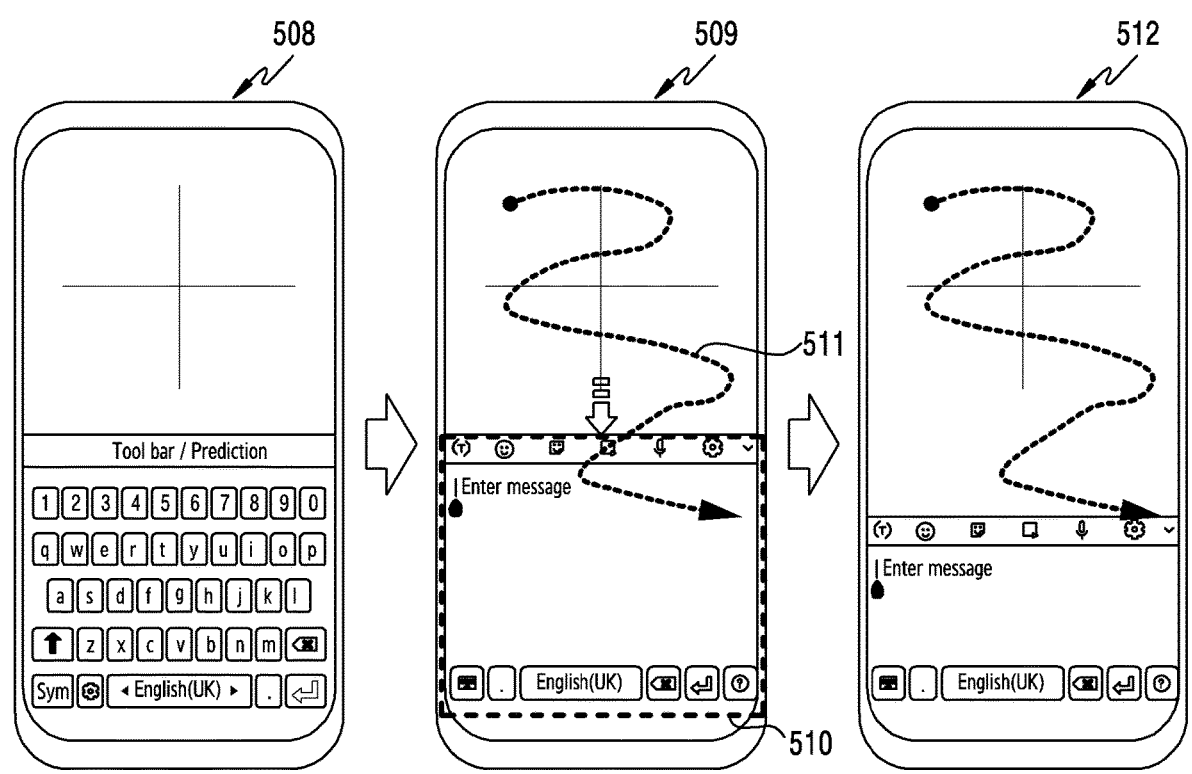
FIG. 5C is a diagram illustrating another example of a representation of a virtual input tool that varies according to various embodiments of the disclosure.

FIG. 5C is a diagram illustrating another example of a representation of a virtual input tool that varies according to various embodiments of the disclosure.

Referring to FIG. 5C, the processor 210 may display the virtual touch pad in a first area and may display the virtual keyboard in a second area, using the display 230 in a state 508. Although not illustrated in FIG. 5C, according to various embodiments, the processor 210 may display the first user interface on the display of the electronic device 102 using the communication circuitry 240 in the state 508. According to various embodiments, the processor 210 may receive an input for entering a mode for inputting a handwritten character in the state 508. For example, in the state 508, the processor 210 may receive an input for changing the virtual keyboard mode to a mode for inputting a handwritten character. According to various embodiments, the input may be received via a voice signal. According to various embodiments, the input may be received via a depression input on a physical button of the electronic device 101. According to various embodiments, the input may be received via a touch input on a specified key among the plurality of keys included in the virtual keyboard. However, the disclosure is not limited thereto. According to various embodiments, the processor 210 may change the state 508 to a state 509 in response to the reception of the input. According to various embodiments, the state 509 may indicate a state of displaying a recognition result field 510 changed from the virtual keyboard in the second area. According to various embodiments, the recognition result field 510 may indicate a field for providing information associated with a character recognized on the basis of the path of a drawing input or a handwritten input received on the virtual touch pad. For example, the processor 210 may perform character recognition on the basis of the path of the handwritten input received on the virtual touch pad, and may display information associated with the result of the character recognition in the recognition result field 510. According to various embodiments, the processor 210 may receive an input 511 initiated from the first area displaying the virtual touch pad in the state 509. According to various embodiments, while the input 511 is maintained on the display, the processor 210 may identify that the input 511 is directed from the first area toward the second area displaying the recognition result field 510. According to various embodiments, the processor 210 may change the state 509 to a state 512 in response to the identification. According to various embodiments, the state 512 may indicate a state of changing a representation of the recognition result field 510 so as to avoid contact between the input 511 and the recognition result field 510. For example, in the state 512, the processor 210 may move the recognition result field 510 below the input 511 using the display 230 so as to avoid contact between the input 511 and the recognition result field 510. According to various embodiments, the processor 210 may restore the previous representation of the recognition result field 510 in response to identifying that the input 511 is released.

Figure 5D:
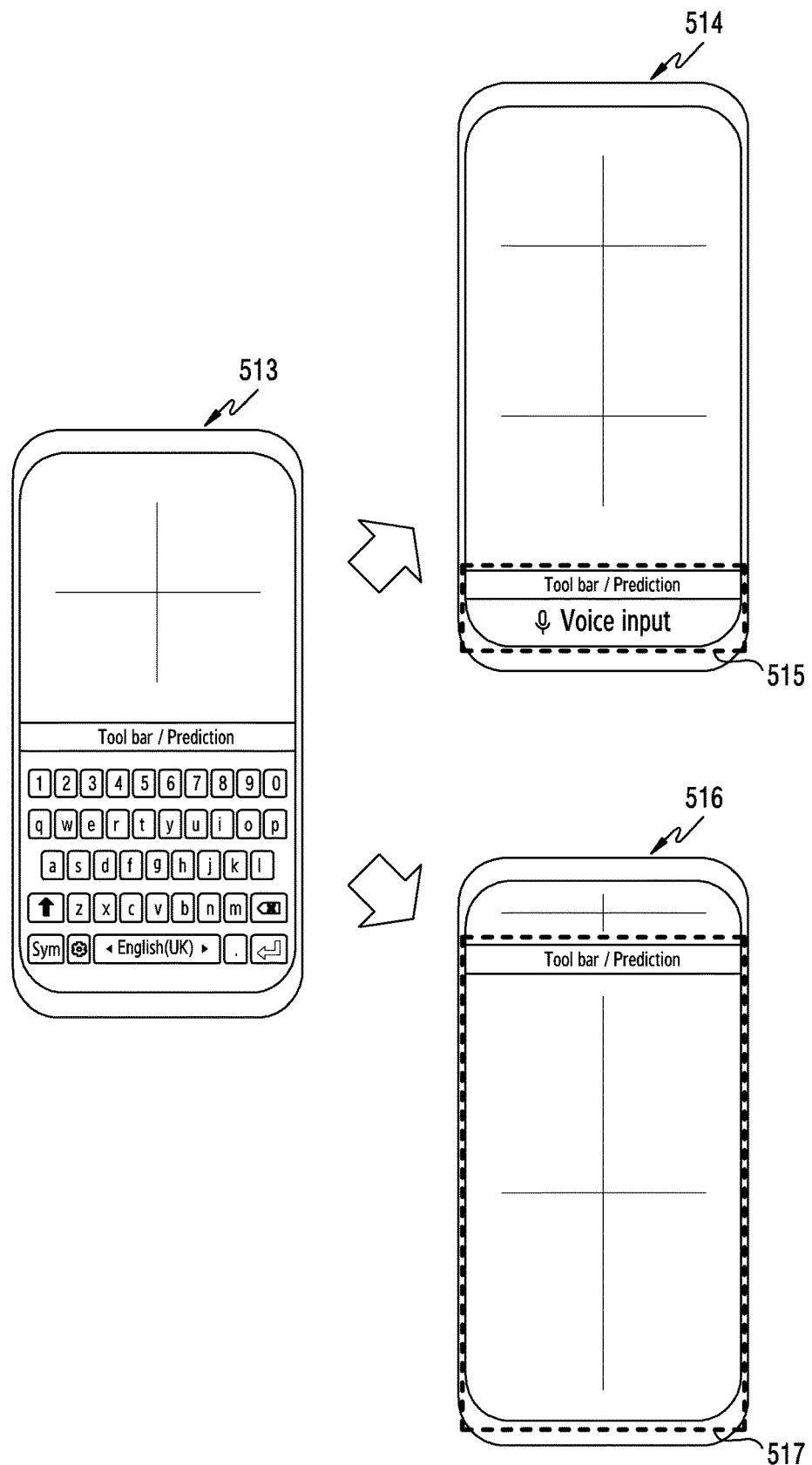
FIG. 5D is a diagram illustrating another example of a representation of a virtual input tool that varies according to various embodiments of the disclosure.

FIG. 5D is a diagram illustrating another example of a representation of a virtual input tool that varies according to various embodiments of the disclosure.

Referring to FIG. 5D, the processor 210 may display the virtual touch pad in a first area and may display the virtual keyboard in a second area, using the display 230 in a state 513. Although not illustrated in FIG. 5D, according to various embodiments, the processor 210 may display the first user interface on the display of the electronic device 102 using the communication circuitry 240 in the state 513. According to various embodiments, the processor 210 may receive an input for entering at least one other mode (another mode) which is distinct from a mode currently provided in the electronic device 101 in the state 513. For example, the at least one other mode may indicate a mode for receiving an interaction of another type, which is at least distinct from a type of an interaction currently provided in the electronic device 101, when receiving an interaction for the first user interface in the electronic device 101. For example, the at least one other mode may include at least one of a mode for inputting a handwritten character, a mode for inputting an emoticon or an emoji, a mode for inputting an augmented reality (AR) sticker, a mode for inputting a dynamic image (e.g., an image in the graphics interchange format (GIF) format), a mode for inputting a live message, or a mode for inputting a voice signal. According to various embodiments, the input for entering another mode may be received via a voice signal. According to various embodiments, the input for entering another mode may be received via a depression input on a physical button of the electronic device 101. According to various embodiments, the input for entering another mode may be received via a touch input on a specified key among a plurality of keys included in the virtual keyboard.

According to various embodiments, the processor 210 may change the size of an area displaying the virtual touch pad, on the basis of the size of a display area required for providing the at least one other mode.

For example, the processor 210 may change the state 513 to a state 514 in response to the reception of the input for entering another mode. According to various embodiments, the state 514 may indicate a state of receiving a voice input in the electronic device 101. According to various embodiments, the state 514 may indicate a state of displaying at least one visual object 515 for indicating that a voice input is available. According to various embodiments, the state 514 may indicate a state of displaying the at least one visual object 515 which is changed from the virtual keyboard. The size of an area required for displaying the at least one visual object 515 may be smaller than the size of an area required for displaying the virtual keyboard. Accordingly, the processor 210 may enlarge the virtual touch pad and display the same in the state 514. According to various embodiments, the processor 210 may change a scheme of processing an input on the virtual touch pad in response to changing of the state 513 to the state 514. For example, since the area for displaying the virtual touch pad in the state 514 is larger than the area for displaying the virtual touch pad in the state 513, the processor 210 may process an input on the virtual touch pad according to an absolute coordinate scheme in the state 514, whereas the processor 210 may process an input on the virtual touch pad according to a relative coordinate scheme in the state 513. In other words, the processor 210 may process an input on the virtual touch pad on the basis of the distance between the start point and the end point of the input in the state 513, whereas the processor 210 may process an input on the touch pad on the basis of the coordinates associated with the input in the state 514.

As another example, the processor 210 may change the state 513 to a state 516 in response to the reception of the input for entering another mode. According to various embodiments, the state 516 may indicate a state that requires displaying of visual objects, the number of which is greater than the number of all keys included in the virtual keyboard, or requires displaying of visual objects, the sizes of which are larger than each of the keys included in the virtual keyboard. According to various embodiments, the state 516 may indicate a state of displaying a field 517 which is changed from the virtual keyboard and includes a plurality of virtual objects. The size of an area required for displaying the field 517 may be larger than the size of an area required for displaying the virtual keyboard. Accordingly, the processor 210 may reduce the virtual touch pad and display the same in the state 516. According to various embodiments, the processor 210 may maintain the scheme of processing an input on the virtual touch pad, independently from changing of the state 513 to the state 516. However, the disclosure is not limited thereto.

Figure 5E:
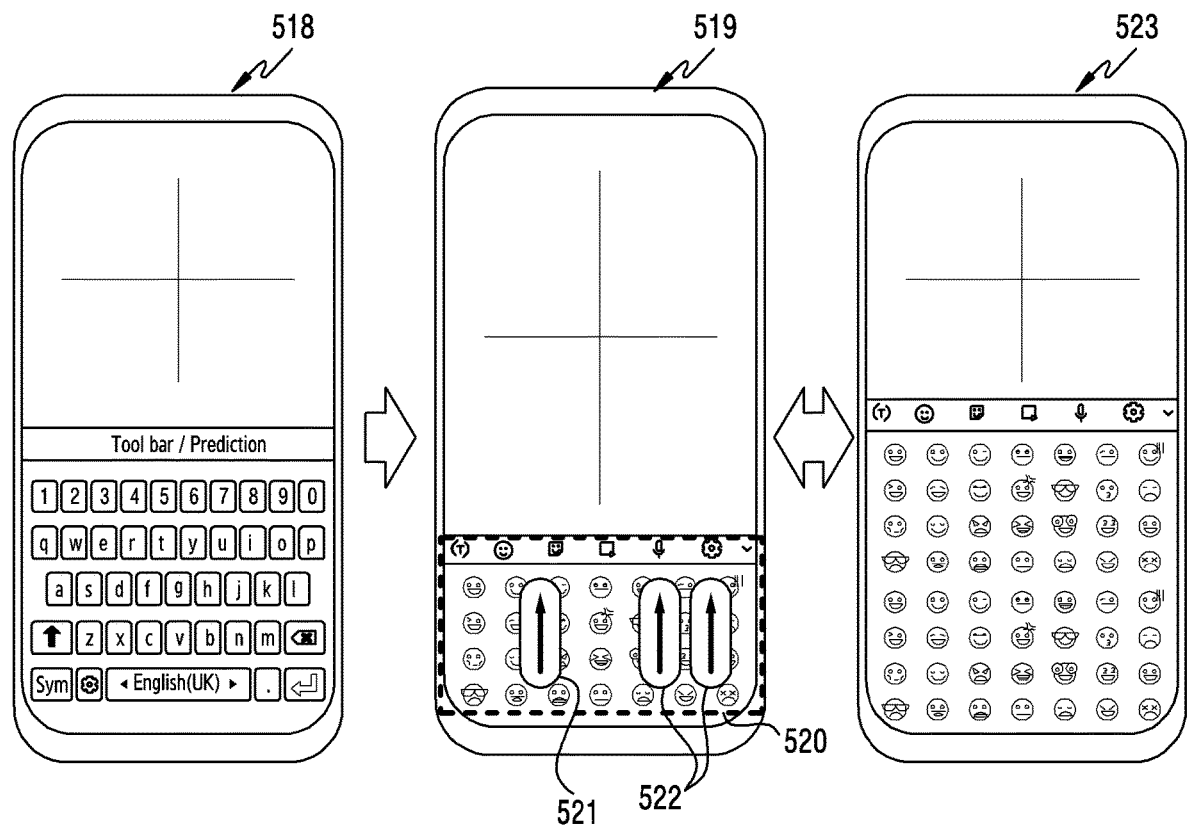
FIG. 5E is a diagram illustrating another example of a representation of a virtual input tool that varies according to various embodiments of the disclosure.

FIG. 5E is a diagram illustrating another example of a representation of a virtual input tool that varies according to various embodiments of the disclosure.

Referring to FIG. 5E, the processor 210 may display the virtual touch pad in a first area and may display the virtual keyboard in a second area, using the display 230 in a state 518. Although not illustrated in FIG. 5E, according to various embodiments, the processor 210 may display the first user interface on the display of the electronic device 102 using the communication circuitry 240 in the state 518. According to various embodiments, in the state 518, the processor 210 may receive an input for entering a mode for displaying a visual object that requires an area larger than an area required for displaying a plurality of keys included in the virtual keyboard. For example, the input may be received via a voice signal. As another example, the input may be received via a depression input on a physical button of the electronic device 101. As another example, the input may be received via a touch input on a specified key among a plurality of keys included in the virtual keyboard. However, the disclosure is not limited thereto.

According to various embodiments, the processor 210 may change the state 518 to a state 519 in response to the reception of the input. According to various embodiments, the state 519 may indicate a state of displaying an area 520 which is changed from the virtual keyboard and includes some of a plurality of virtual objects. According to various embodiments, the state 519 indicates a state in which the virtual touch pad is enlarged and displayed. According to various embodiments, in the state 519, the processor 210 may receive an input 521 for scrolling through the area 520 including some of the plurality of visual objects at a speed less than a specified speed or for scrolling with a single finger. According to various embodiments, in the state 519, the processor 210 may scroll through the visual objects included in the area 520 in response to the reception of the input 521. For example, in response to the reception of the input 521, the processor 210 may remove at least some of the visual objects which were included in the area 520 before the input 521 is received, and may display some of the remaining visual objects in the area 520. According to various embodiments, the size of the area 520 may be maintained independently from the input 521, or independently from scrolling through the visual objects. According to various embodiments, the processor 210 may receive an input 522 for scrolling through the area 520 including some of the plurality of visual objects at a specified speed or higher, or for scrolling with multiple fingers, in the state 519. According to various embodiments, the processor 210 may change the state 519 to a state 523 in response to the reception of the input 522. According to various embodiments, the state 523 may indicate a state in which the area 520 is enlarged and displayed. According to various embodiments, the state 523 may indicate a state of displaying visual objects, the number of which is larger than the number of visual objects displayed in the state 519. According to various embodiments, the processor 210 may restore the state 519 from the state 523 in response to receiving of an input having the orientation opposite to that of the input 522. According to various embodiments, the processor 210 may restore the state 519 from the state 523, in response to receiving of an input for selecting at least one of the visual objects displayed in the state 523. According to various embodiments, the processor 210 may restore the state 519 from the state 523, in response to the fact that a user input is not received during a specified period of time in the state 523. However, the disclosure is not limited thereto.

According to various embodiments, the processor 210 may change a representation of the virtual input tool, on the basis of the information associated with the posture of the electronic device 101 which is obtained using the sensor circuitry 250, while the virtual input tool is displayed.

Figure 6:
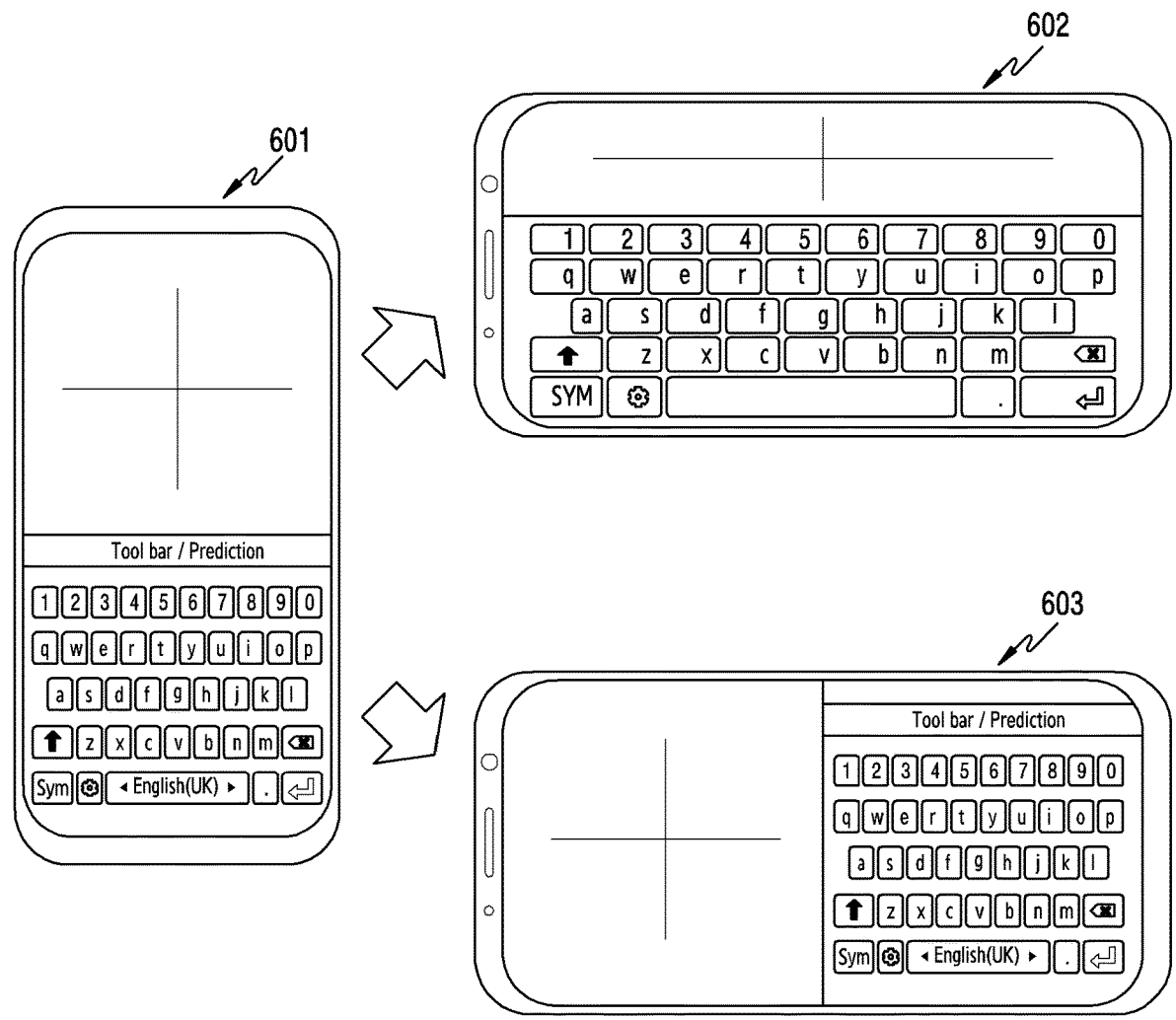
FIG. 6 is a diagram illustrating another example of a representation of a virtual input tool that varies according to various embodiments of the disclosure.

FIG. 6 is a diagram illustrating another example of a representation of a virtual input tool that varies according to various embodiments of the disclosure.

Referring to FIG. 6, the processor 210 may display the virtual touch pad in a first area and may display the virtual keyboard in a second area while identifying, using the sensor circuitry 250, that the electronic device 101 is in the portrait state (or portrait mode) as shown in a state 601.

The processor 210 may change the state 601 to a state 602 in response to identifying, using the sensor circuitry 250, that the electronic device 101 is changed from the portrait state to the landscape state (or landscape mode) in the state

601. According to various embodiments, the state 602 may indicate a state of displaying the virtual touch pad and the virtual keyboard at an aspect ratio which is different from that of the state 601. The virtual keyboard displayed in the state 602 may be displayed below the virtual touch pad as shown in the state 601.

The processor 210 may change the state 601 to a state 603 in response to identifying, using the sensor circuitry 250, that the electronic device 101 is changed from the portrait state to the landscape state (or landscape mode) in the state 601. According to various embodiments, the state 603 may indicate a state of displaying the virtual touch pad and the virtual keyboard in an arrangement which is different from that of the state 601. For example, the virtual keyboard displayed in the state 603 may be displayed beside the virtual touch pad, unlike the state 601. According to various embodiments, the aspect ratio of at least one of the virtual touch pad or the virtual keyboard displayed in the state 603 may correspond to the aspect ratio of at least one of the virtual touch pad or the virtual keyboard displayed in the state 601, or may different from the aspect ratio of at least one of the virtual touch pad or the virtual keyboard displayed in the state 601. However, the disclosure is not limited thereto.

According to various embodiments, the processor 210 may change a representation of the virtual input tool on the basis of a user input received while the virtual input tool is displayed.

Figure 7A:
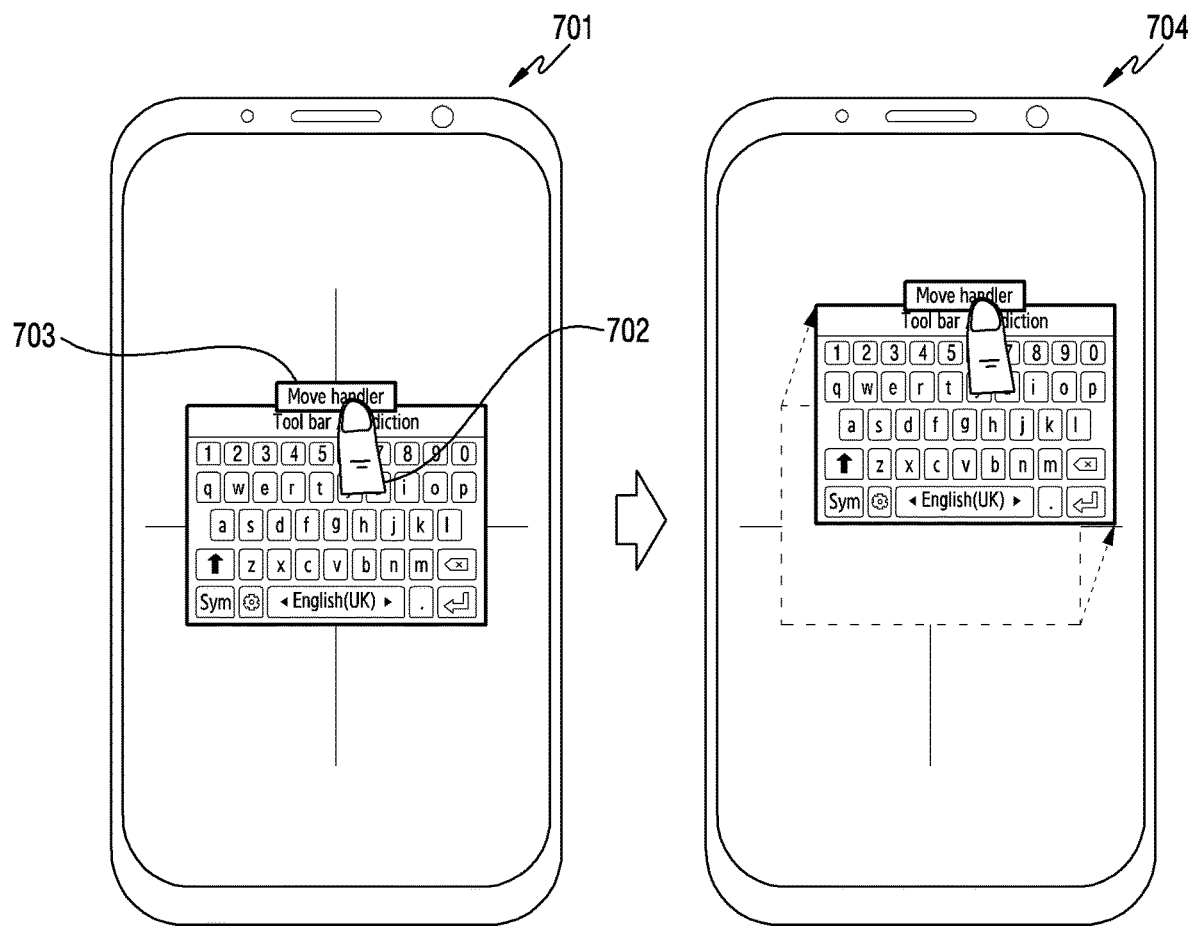
FIG. 7A is a diagram illustrating another example of a representation of a virtual input tool that varies according to various embodiments of the disclosure.

FIG. 7A is a diagram illustrating another example of a representation of a virtual input tool that varies according to various embodiments of the disclosure.

Referring to FIG. 7A, in a state 701, the processor 210 may display the virtual touch pad in a first area and may display the virtual keyboard in a second area that is superimposed on at least a part of the first area. In the state 701, the processor 210 may receive an input 702 for moving the virtual keyboard, while displaying the virtual touch pad in the first area and displaying the virtual keyboard in the second area which is superimposed on at least the part of the first area. According to various embodiments, the input 702 may be received via an object 703 configured to move the virtual keyboard. According to various embodiments, the input 702 may be received via a specified side among a plurality of sides of the virtual keyboard. However, the disclosure is not limited thereto. In response to the reception of the input 702, the processor 210 may display the virtual keyboard in an area to which the virtual keyboard moves by the input 702, as shown in the state 704.

Figure 7B:
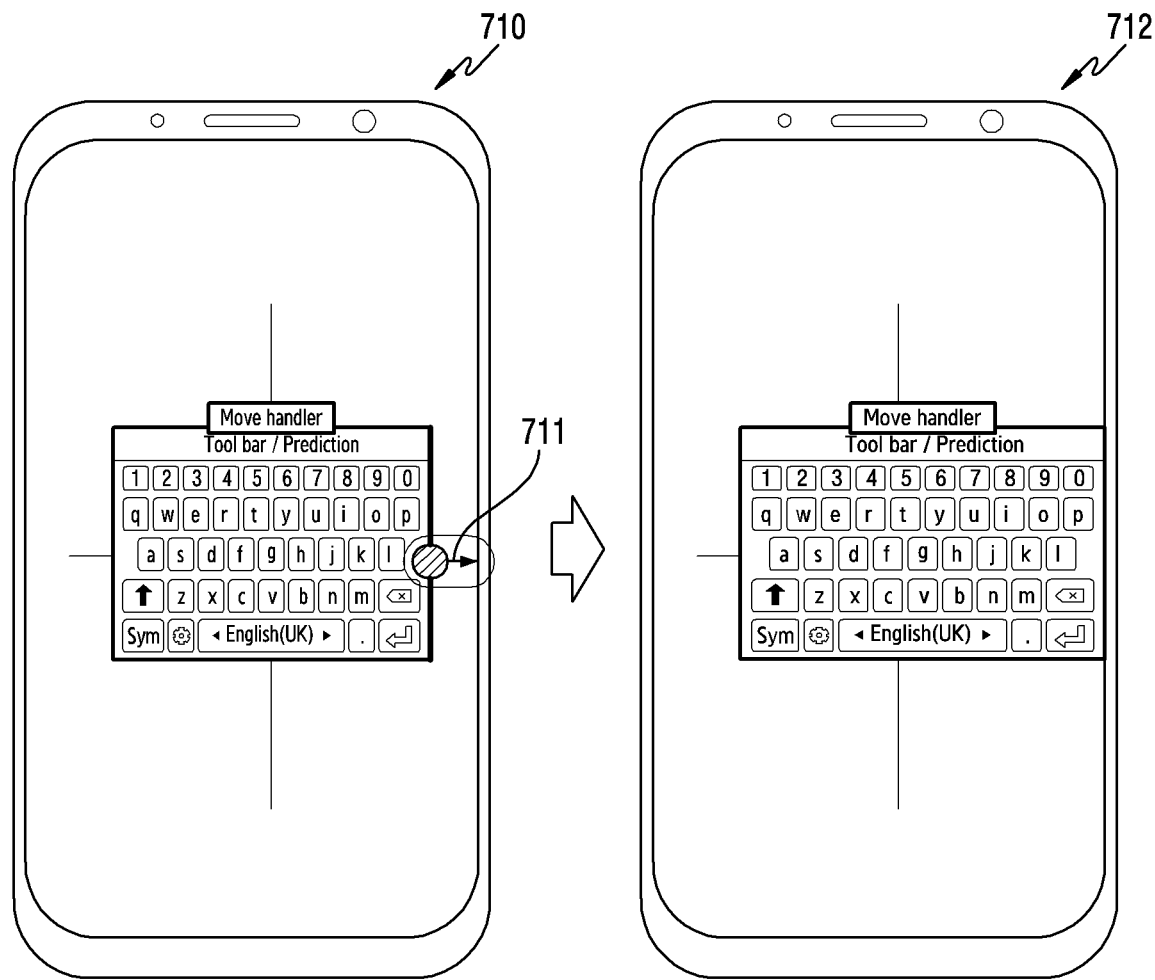
FIG. 7B is a diagram illustrating another example of a representation of a virtual input tool that varies according to various embodiments of the disclosure.

FIG. 7B is a diagram illustrating another example of a representation of a virtual input tool that varies according to various embodiments of the disclosure.

Referring to FIG. 7B, in a state 710, the processor 210 may display the virtual touch pad in a first area and may display the virtual keyboard in a second area that is superimposed on at least a part of the first area. In the state 710, the processor 210 may receive an input 711 for adjusting the size of the virtual keyboard, while displaying the virtual touch pad in the first area and displaying the virtual keyboard in the second area which is superimposed on at least the part of the first area. According to various embodiments, the input 711 may be initiated from any one of a plurality of sides of the virtual keyboard. In response to the reception of the input 711, the processor 210 may display the virtual keyboard of which the size has been adjusted (e.g., enlarged or reduced) by the input 711, as shown in the state 712.

Figure 7C:
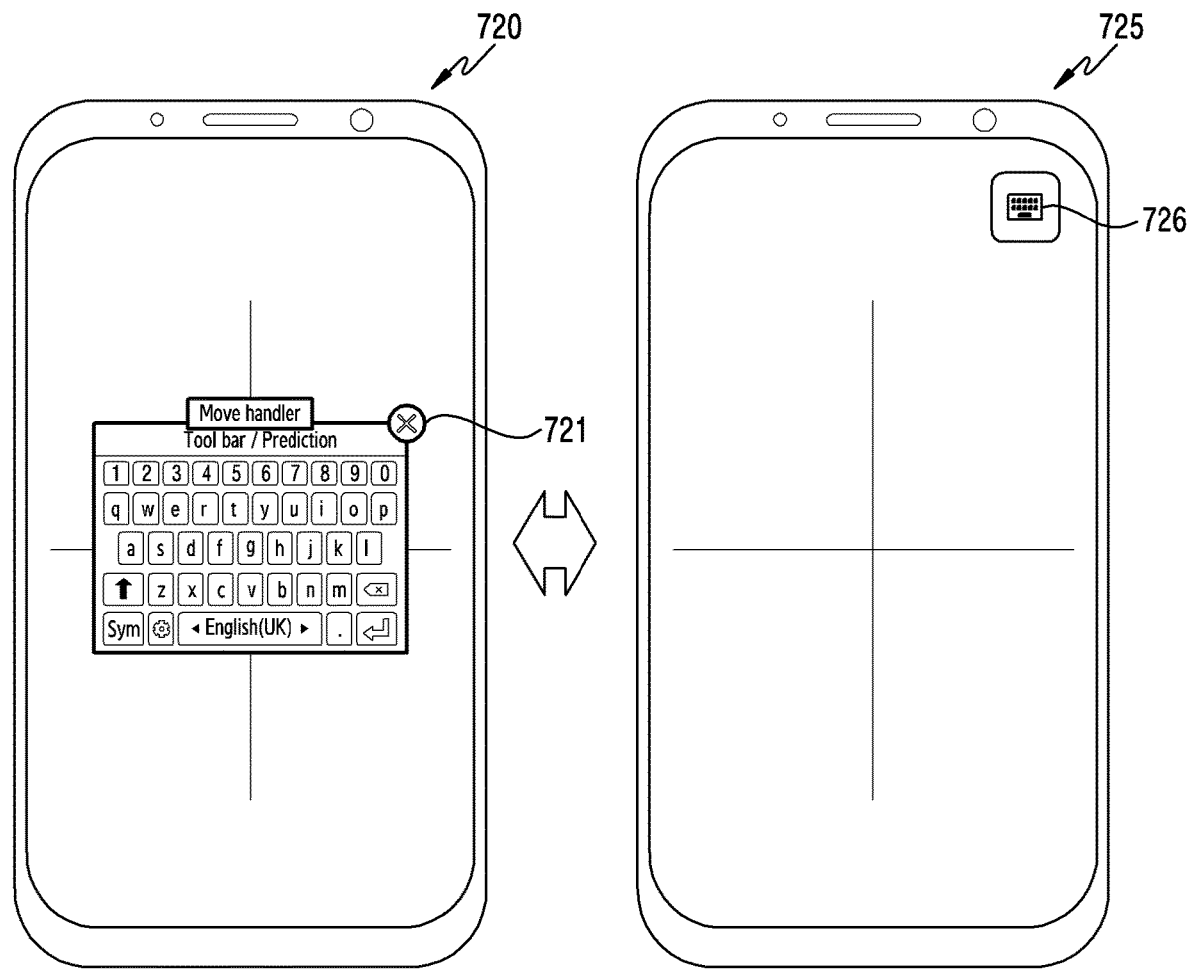
FIG. 7C is a diagram illustrating another example of a representation of a virtual input tool that varies according to various embodiments of the disclosure.

FIG. 7C is a diagram illustrating another example of a representation of a virtual input tool that varies according to various embodiments of the disclosure.

Referring to FIG. 7C, in a state 720, the processor 210 may display the virtual touch pad in a first area and may display the virtual keyboard in a second area that is superimposed on at least a part of the first area. In the state 720, the processor 210 may receive an input on an object 721 displayed in an area related to the virtual keyboard, while displaying the virtual touch pad in the first area and displaying the virtual keyboard in the second area which is superimposed on at least the part of the first area. According to various embodiments, the processor 210 may change the state 720 to a state 725 in response to the reception of the input on the object 721, in the state 720. According to various embodiments, the state 725 may indicate a state of suspending displaying of the virtual keyboard. According to various embodiments, in the state 725, the processor 210 may display an icon 726 for restoring the virtual keyboard, to be superimposed on the virtual touch pad. According to various embodiments, the icon 726 may include a visual object for indicating the virtual keyboard. According to various embodiments, the icon 726 may be moved on the virtual touch pad. For example, the icon 726 may be moved on the virtual touch pad on the basis of a drag input on the icon 726. According to various embodiments, the processor 210 may restore the state 720 from the state 725 in response to the reception of the input on the icon 726 in the state 725. For example, the processor 210 may display the virtual keyboard in a location where the virtual keyboard was displayed, in response to reception of the input on the icon 726. However, the disclosure is not limited thereto.

As described above, while a user interface of an application being executed in the electronic device 101 is displayed on the display of the electronic device 102 connected to the electronic device 101, the electronic device 101 according to various embodiments may display, using the display 230, a virtual input tool for providing an interaction with respect to the user interface. The electronic device 101 according to various embodiments may display the virtual input tool on the basis of a specified input received by the electronic device 101 or the electronic device 102, such that a user may intuitively use the virtual input tool. The electronic device 101 according to various embodiments may disable at least one function of the virtual touch pad or the virtual keyboard, or may change a representation related to at least one of the virtual touch pad or the virtual keyboard, in order to prevent an input error while the virtual touch pad and the virtual keyboard are concurrently displayed as the virtual input tool. The electronic device 101 according to various embodiments may change a representation (e.g., the size or the displayed location) of the virtual input tool, or may change an attribute (e.g., an absolute coordinate scheme, a relative coordinate scheme, or the like) of an input received via the virtual input tool, such that a user may easily use the virtual input tool. In other words, the electronic device 101 may provide enhanced user experience by providing the virtual input tool.

As described above, an electronic device (e.g., the electronic device 101) according to various embodiments may include: communication circuitry (e.g., the communication circuitry 240); at least one memory (e.g., the memory 220) storing instructions; a display (e.g., the display 230); and at least one processor (e.g., the processor 210), wherein the at least one processor, when executing the instructions, is configured to: display, using the communication circuitry, a first user interface of an application being executed in the electronic device on a display of an external device; while displaying the first user interface on the display of the external device, receive a specified input; and in response to the reception, display, on the display of the electronic device, a virtual touch pad in a first area and a virtual keyboard in a second area distinct from the first area.

According to various embodiments, the at least one processor, when executing the instructions, is configured to: while displaying the first user interface of the application on the display of the external device, display a second user interface of the application in an area including the first area and the second area by using the display of the electronic device; and in response to the reception, display the virtual touch pad and the virtual keyboard that are changed from the second user interface by using the display of the electronic device.

According to various embodiments, the at least one processor, when executing the instructions, is further configured to: while displaying the virtual touch pad in the first area and the virtual keyboard in the second area, receive a drag input from the first area toward the second area; while contact of the drag input is maintained on the display of the electronic device, recognize a path of the drag input that moves across over any one of a plurality of keys included in the virtual keyboard as a portion of an input on the virtual touch pad instead of an input on the virtual keyboard; and based on the recognition, change, by using the communication circuitry, a representation of the first user interface being displayed on the display of the external device. According to various embodiments, the at least one processor, when executing the instructions, is configured to: while the contact of the drag input is maintained on the display of the electronic device, recognize the path of the drag input that moves across over any one of the plurality of keys included in the virtual keyboard as the portion of the input on the virtual touch pad instead of the input on the virtual keyboard by disabling the virtual keyboard in response to identifying that the drag input is initiated. According to various embodiments, the at least one processor, when executing the instructions, is further configured to: display a translucent layer for indicating that the virtual keyboard is disabled over the virtual keyboard while the contact of the drag input is maintained on the display of the electronic device.

According to various embodiments, the at least one processor, when executing the instructions, is further configured to: while displaying the virtual touch pad in the first area and the virtual keyboard in the second area, receive a drag input from the first area; and in response to identifying that the drag input is directed from the first area toward the second area while the contact of the drag input is maintained on the display of the electronic device, change a representation of the virtual keyboard to avoid contact between the drag input and the virtual keyboard. According to various embodiments, the at least one processor, when executing the instructions, is further configured to: in response to identifying that the drag input is directed from the second area to the first area while the contact of the drag input is maintained on the display of the electronic device, restore the previous representation of the virtual keyboard.

According to various embodiments, the at least one processor, when executing the instructions, is further configured to: in response to identifying that an orientation of the electronic device is changed while displaying the virtual touch pad in the first area and the virtual keyboard in the second area by using the display of the electronic device, change an arrangement of the virtual touch pad and the virtual keyboard.

According to various embodiments, the at least one processor, when executing the instructions, is further configured to: in response to receiving a touch input for moving a specified side among sides of the virtual keyboard while displaying the virtual touch pad in the first area and the virtual keyboard in the second area by using the display of the electronic device, move the virtual keyboard from the second area. According to various embodiments, the at least one processor, when executing the instructions, is further configured to: in response to receiving a touch input for moving a side among the remaining sides of the virtual keyboard, while displaying the virtual touch pad in the first area and the virtual keyboard in the second area by using the display of the electronic device, enlarge or reduce an area that displays the virtual keyboard.

According to various embodiments, the at least one processor, when executing the instructions, is further configured to: while displaying the first user interface of the application on the display of the external device, display a second user interface of the application in an area including the first area and the second area by using the display of the electronic device, and wherein the specified input corresponds to a touch input on a designated object among a plurality of executable objects that are included in the second user interface.

According to various embodiments, the specified input corresponds to identifying that posture of the electronic device is changed to a specified posture while displaying the first user interface of the application on the display of the external device.

According to various embodiments, the at least one processor, when executing the instructions, is further configured to: while displaying the first user interface of the application on the display of the external device, display a second user interface of the application in an area including the first area and the second area by using the display of the electronic device, and wherein the specified input corresponds to a touch input on a text input portion included in the first user interface or a text input portion included in the second user interface.

According to various embodiments, the second area is disposed below the first area.

According to various embodiments, a non-transitory computer readable storage medium may store a program, wherein the program, when executed by a processor of an electronic device, causes the electronic device to: display a first user interface of an application being executed in the electronic device on a display of another electronic device distinct from the electronic device; in response to receiving a specified input while displaying the first user interface on the display of the other electronic device, display, by using a display of the electronic device, a virtual touch pad in a first area and a virtual keyboard in a second area distinct from the first area.

According to various embodiments, the program further causes the electronic device to: while displaying the first user interface of the application on the display of the other electronic device, display a second user interface of the application in an area including the first area and the second area by using the display of the electronic device; and in response to the reception, display the virtual touch pad and the virtual keyboard that are changed from the second user interface by using the display of the electronic device.

According to various embodiments, the program further causes the electronic device to: while displaying the virtual touch pad in the first area and the virtual keyboard in the second area, receive a drag input from the first area toward the second area; while contact of the drag input is maintained on the display of the electronic device, recognize a path of the drag input that moves across over any one of a plurality of keys included in the virtual keyboard as a portion of an input on the virtual touch pad instead of an input on the virtual keyboard; and based on the recognition, change, by using a communication circuitry of the electronic device, a representation of the first user interface being displayed on the display of the other electronic device. According to various embodiments, the program further causes the electronic device to: display a translucent layer for indicating that the virtual keyboard is disabled over the virtual keyboard while the contact of the drag input is maintained on the display of the electronic device.

According to various embodiments, the program further causes the electronic device to: while displaying the virtual touch pad in the first area and the virtual keyboard in the second area, receive a drag input from the first area; and in response to identifying that the drag input is directed from the first area toward the second area while the contact of the drag input is maintained on the display of the electronic device, change a representation of the virtual keyboard to avoid contact between the drag input and the virtual keyboard. According to various embodiments, the program further causes the electronic device to: in response to identifying that the drag input is directed from the second area to the first area while the contact of the drag input is maintained on the display of the electronic device, restore the previous representation of the virtual keyboard.

Figure 8:
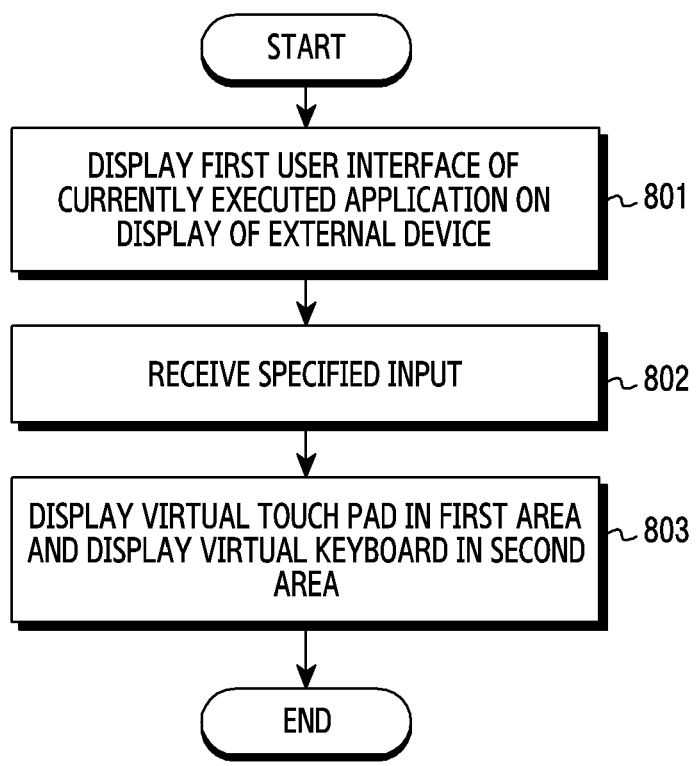
FIG. 8 is a diagram illustrating an example of the operation of an electronic device according to various embodiments of the disclosure.

FIG. 8 is a diagram illustrating an example of the operation of an electronic device according to various embodiments of the disclosure. The operation may be performed by the electronic device 101 illustrated in FIG. 1 or 2, or by the processor 210 included in the electronic device 101.

Referring to FIG. 8, in operation 801 the processor 210 may display a first user interface of an application being executed in the electronic device 101 on a display of an external electronic device, using the communication circuitry 240. According to various embodiments, the processor 210 may display a second user interface of the application using the display 230, while displaying the first user interface of the application on the display of the external device. According to various embodiments, the size of the display area of the display of the external electronic device may be larger than the size of the display area of the display 230. According to various embodiments, the first user interface may include contents provided by the second user interface and other contents that are not provided by the second user interface.

In operation 802, the processor 210 may receive a specified input while the first user interface is displayed on the display of the external electronic device. For example, the specified input may correspond to a touch input on a specified object among a plurality of executable objects included in the second user interface. As another example, the specified input may correspond to identifying that the posture of the electronic device 101 is changed to a specified posture while the first user interface is displayed on the display of the external device. As another example, the specified input may correspond to an input on a text input portion included in the first user interface or an input on a text input portion included in the second user interface. However, the disclosure is not limited thereto.

In operation 803, the processor 210 may display a virtual touch pad in a first area and may display a virtual keyboard in a second area distinct from the first area, using the display 230, in response to the reception of the specified input. For example, the second area may be disposed below the first area. According to various embodiments, the processor 210 may display the virtual touch pad and the virtual keyboard, which are changed from the second user interface, in response to the reception of the specified input. According to various embodiments, the processor 210 may change the arrangement or a representation of the virtual touch pad and the virtual keyboard, in response to identifying that the orientation of the electronic device 101 is changed, while displaying the virtual touch pad in the first area and displaying the virtual keyboard in the second area. According to various embodiments, the processor 210 may move the virtual keyboard from the second area to another area, in response to reception of a touch input for moving a specified side among the sides of the virtual keyboard, while displaying the virtual touch pad in the first area and displaying the virtual keyboard in the second area. According to various embodiments, the processor 210 may enlarge or reduce an area for displaying the virtual keyboard, in response to reception of a touch input for moving one of the remaining sides of the virtual keyboard, while displaying the virtual touch pad in the first area and displaying the virtual keyboard in the second area. However, the disclosure is not limited thereto.

As described above, the electronic device 101 according to various embodiments may concurrently display the virtual touch pad and the virtual keyboard as the virtual input tool, such that a user easily causes an interaction with respect to the user interface of the application displayed on the display of the external device. The electronic device 101 may provide enhanced user experience by displaying the virtual touch pad and the virtual keyboard.

Figure 9:
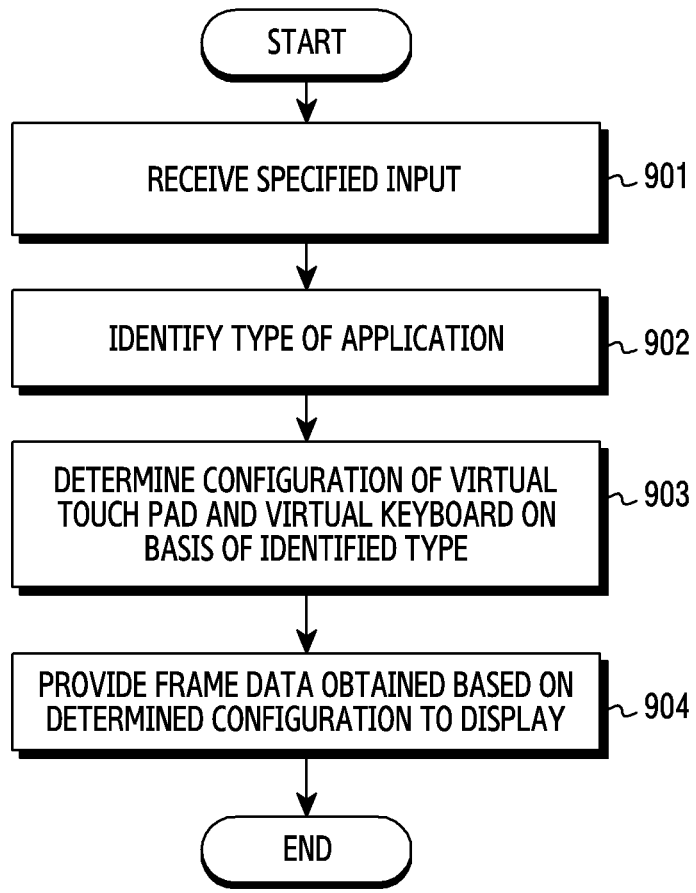
FIG. 9 is a diagram illustrating an example of an operation of determining the arrangement of a virtual touch pad and a virtual keyboard by an electronic device according to various embodiments of the disclosure.

FIG. 9 is a diagram illustrating an example of an operation of determining the arrangement of a virtual touch pad and a virtual keyboard by an electronic device according to various embodiments of the disclosure. The operation may be performed by the electronic device 101 illustrated in FIG. 1 or 2, or by the processor 210 included in the electronic device 101.

Operations 901 to 904 of FIG. 9 may be related to operation 802 of FIG. 8.

Referring to FIG. 9, in operation 901, the processor 210 may receive the specified input.

In operation 902, the processor 210 may identify the application type of the application that provides the user interface being displayed on the display of the external device, in response to the reception of the specified input. For example, the processor 210 may identify whether the application is an application for editing documents, an application for playing a game, an application for web searching, or the like.

In operation 903, the processor 210 may determine the configuration of the virtual touch pad and the virtual keyboard, on the basis of the identified application type. For example, the processor 210 may determine to display the virtual touch pad to be larger than the virtual keyboard, when the application that provides the user interface being displayed on the display of the external device is identified to be an application that mainly requires movement of a pointer. As another example, the processor 210 may determine to display the virtual touch pad to be smaller than the virtual keyboard when the application that provides the user interface being displayed on the display of the external device is identified to be an application that mainly requires input of characters. However, the disclosure is not limited thereto.

In operation 904, the processor 210 may provide frame data obtained on the basis of the determined configuration to the display 230. For example, the processor 210 may record the frame data in memory (e.g., graphic RAM (GRAM)) embedded in the display 230. The frame data may be used to display the virtual touch pad and the virtual keyboard on the display.

As described above, the electronic device 101 according to various embodiments may adaptively change the configuration of the virtual touch pad and the virtual keyboard according to an application type. The electronic device 101 according to various embodiments may provide enhanced user experience by adaptively making a change.

Figure 10:
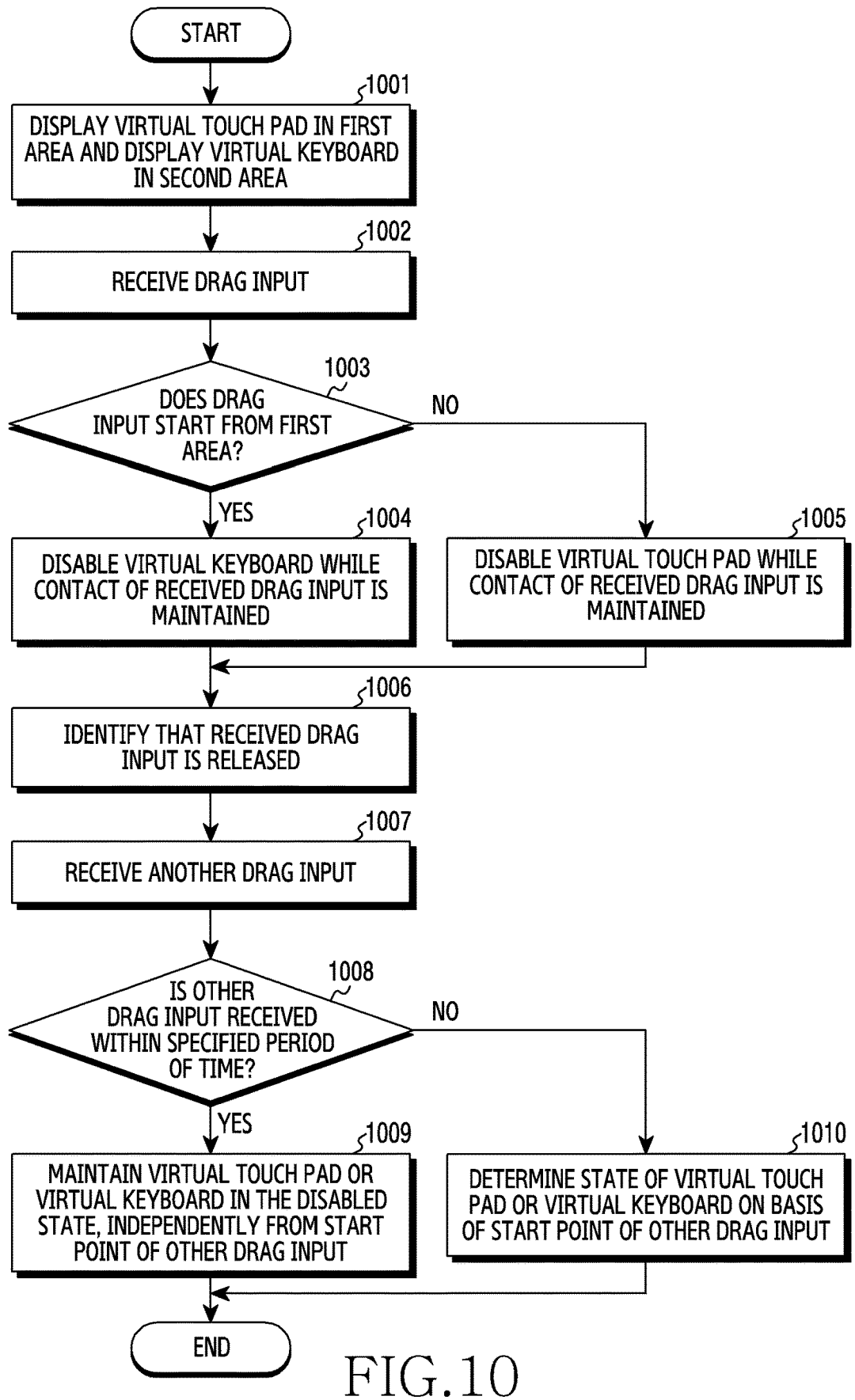
FIG. 10 is a diagram illustrating an example of an operation of disabling a virtual touch pad and a virtual keyboard by an electronic device according to various embodiments of the disclosure.

FIG. 10 is a diagram illustrating an example of an operation of disabling a virtual touch pad and a virtual keyboard by an electronic device according to various embodiments of the disclosure. The operation may be performed by the electronic device 101 illustrated in FIG. 1 or 2, or by the processor 210 included in the electronic device 101.

Operations 1001 to 1010 of FIG. 10 may be related to operation 803 of FIG. 8.

Referring to FIG. 10, in operation 1001, the processor 210 may display the virtual touch pad in the first area and may display the virtual keyboard in the second area.

In operation 1002, the processor 210 may receive a drag input while displaying the virtual touch pad in the first area and displaying the virtual keyboard in the second area.

In operation 1003, the processor 210 may identify whether the drag input starts from the first area. For example, the processor 210 may identify whether the drag input starts from the first area in order to prevent an input error based on the drag input from occurring on the virtual keyboard or the virtual touch pad. The processor 210 may perform operation 1004 in response to identifying that the drag input starts from the first area. Unlike the above, the processor 210 may perform operation 1005 in response to identifying that the drag input starts from the second area.

In operation 1004, the processor 210 may disable the virtual keyboard while contact of the drag input is maintained on the display, in response to identifying that the drag input starts from the first area. The processor 210 may disable the virtual keyboard in order to prevent an input error based on the drag input from occurring on the virtual keyboard.

In operation 1005, the processor 210 may disable the virtual touch pad while contact of the drag input is maintained on the display, in response to identifying that the drag input starts from the second area. The processor 210 may disable the virtual touch pad in order to prevent an input error based on the drag input from occurring on the virtual touch pad.

In operation 1006, the processor 210 may identify that the drag input is released, while disabling the virtual keyboard or the virtual touch pad.

In operation 1007, the processor 210 may receive another drag input after the drag input is released.

In operation 1008, the processor 210 may identify whether the other drag input is received with a specified period of time. For example, the processor 210 may identify whether the other drag input is received within the specified period of time in order to identify whether the other drag input is an input subsequent to the drag input. The processor 210 may perform operation 1009 in response to identifying that the other drag input is received within the specified period of time. Unlike the above, the processor 210 may perform operation 1010 in response to identifying that the other drag input is received beyond the specified period of time.

In operation 1009, the processor 210 may maintain the virtual touch pad or the virtual keyboard in the disabled state, independently from the start point of the other drag input, in response to identifying that the other drag input is received within the specified period of time. If it is identified that the other drag input is received within the specified period of time, the processor 210 may maintain the virtual touch pad or the virtual keyboard in the disabled state, independently from the start point of the other drag input, so as to process the other drag input as an input subsequent to the drag input.

In operation 1010, the processor 210 may determine the state of the virtual touch pad or the virtual keyboard on the basis of the start point of the other drag input, in response to identifying that the other drag input is received beyond the specified period of time. For example, if the other drag input starts from the first area displaying the virtual touch pad, the processor 210 may determine the state of the virtual touch pad to be enabled and may determine the state of the virtual keyboard to be disabled, and may control the virtual touch pad and the virtual keyboard on the basis of the determination. As another example, if the other drag input starts from the second area displaying the virtual touch pad, the processor 210 may determine the state of the virtual keyboard to be enabled and may determine the state of the virtual touch pad to be disabled, and may control the virtual touch pad and the virtual keyboard on the basis of the determination.

As described above, the electronic device 101 according to various embodiments may disable the virtual touch pad or the virtual keyboard in order to prevent an input error from unintentionally occurring by a user's input received while the virtual touch pad and the virtual keyboard are concurrently displayed. The electronic device 101 according to various embodiments may provide enhanced user experience by disabling.

As described above, a method of operating an electronic device according to various embodiments may include: displaying a first user interface of an application being executed in the electronic device on a display of an external device; receiving a specified input, while displaying the first user interface on the display of the external device; and in response to the reception, displaying a virtual touch pad in a first area and displaying a virtual keyboard in a second area distinct from the first area, using a display of the electronic device.

According to various embodiments, the operation of displaying the first user interface may include: displaying a second user interface of the application in an area including the first area and the second area, using the display of the electronic device, while displaying the first user interface of the application in the display of the external device. The operation of displaying the virtual touch pad and the virtual keyboard may include: displaying, using the display of the electronic device, the virtual touch pad and the virtual keyboard, which are changed from the second user interface, in response to the reception.

According to various embodiments, the method may further include: receiving a drag input directed from the first area toward the second area, while displaying the virtual touch pad in the first area and displaying the virtual keyboard in the second area; recognizing the path of the drag input that moves across over any one of a plurality of keys included in the virtual keyboard as a part of an input on the virtual touch pad, instead of an input on the virtual keyboard, while contact of the drag input is maintained on the display; and changing a representation of the first user interface being displayed on the display of the external device, using the communication circuitry on the basis of the recognition. According to various embodiments, the operation of recognition may include: while contact of the drag input is maintained on the display, recognizing the path of the drag input that moves across over any one of the plurality of keys included in the virtual keyboard as a part of an input on the virtual touch pad, instead of an input on the virtual keyboard, by disabling the virtual keyboard in response to identifying that the drag input is initiated. According to various embodiments, the method may further include: displaying, over the virtual keyboard, a translucent layer for indicating that the virtual keyboard is disabled, while the contact of the drag input is maintained on the display.

According to various embodiments, the method may further include: receiving a drag input from the first area, while displaying the virtual touch pad in the first area and displaying the virtual keyboard in the second area, and changing a representation of the virtual keyboard in order to avoid contact between the drag input and the virtual keyboard, in response to identifying that the drag input is directed from the first area toward the second area while contact of the drag input is maintained on the display. According to various embodiments, the method may further include: in response to identifying that the drag input is directed from the second area toward the first area, while the contact of the drag input is maintained on the display, restoring the previous representation of the virtual keyboard.

According to various embodiments, the method may further include: changing the arrangement of the virtual touch pad and the virtual keyboard, in response to identifying that the orientation of the electronic device is changed, while the virtual touch pad is displayed in the first area and the virtual keyboard is displayed in the second area, using the display.

According to various embodiments, the method may further include: moving the virtual keyboard from the second area, in response to receiving a touch input for moving a specified side among the sides of the virtual keyboard, while the virtual touch pad is displayed in the first area and the virtual keyboard is displayed in the second area, using the display, According to various embodiments, the method may further include: enlarging or reducing an area for displaying the virtual keyboard, in response to receiving a touch input for moving a single side among the remaining sides of the virtual keyboard, while the virtual touch pad is displayed in the first area and the virtual keyboard is displayed in the second area, using the display.

According to various embodiments, the method may further include displaying, using the display of the electronic device, the second user interface of the application in the area including the first area and the second area, while the first user interface of the application is displayed on the display of the external device, and the specified input may correspond to a touch input on a specified object among a plurality of executable objects included in the second user interface.

According to various embodiments, the method may further include displaying, using the display of the electronic device, the second user interface of the application in the area including the first area and the second area, while the first user interface of the application is displayed on the display of the external device, and the specified input may correspond to a touch input on a text input portion included in the first user interface or a text input portion included in the second user interface.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of these may form a memory in which the program is stored. Further, a plurality of such memories may be included in the electronic device.

In addition, the programs may be stored in an attachable storage device which is accessible through communication networks such as the Internet, Intranet, LAN, WAN, and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
communication circuitry;
at least one memory storing instructions;
a display; and
at least one processor,
wherein the at least one processor, when executing the instructions, is configured to:
execute an application,
transmit, using the communication circuitry, user interface information to an external device, wherein the external device displays a first user interface of the application based on the user interface information,
while the first user interface is displayed by the external device, receive a specified input, in response to receiving the specified input, display, on the display of the electronic device, a virtual touch pad in a first area and a virtual keyboard in a second area distinct from the first area, while displaying the virtual touch pad in the first area and the virtual keyboard in the second area, receive a drag input moving from the first area toward the second area, and while a contact of the drag input is maintained, in response to the drag input moving across a key of the virtual keyboard:
- disable a function of the virtual keyboard,
- display a visual representation on the virtual keyboard for indicating that the virtual keyboard is disabled and that the drag input continues while in the second area, in response to disabling the function of the virtual keyboard, and
- recognize the drag input as a part of an input on the virtual touch pad other than the virtual keyboard.

2. The electronic device of claim 1, wherein the at least one processor, when executing the instructions, is further configured to:
while the first user interface is displayed by the external device, display a second user interface of the application in the first area and the second area; and
in response to receiving the specified input, display the virtual touch pad and the virtual keyboard that are changed by the second user interface.

3. The electronic device of claim 1, wherein the at least one processor, when executing the instructions, is further configured to:
transmit, by using the communication circuitry, information to change the first user interface displayed by the external device based on a path of the drag input.

4. The electronic device of claim 1, wherein the visual representation comprises:
a translucent layer over the virtual keyboard, or a dim or blur on the virtual keyboard.

5. The electronic device of claim 1, wherein the at least one processor, when executing the instructions, is further configured to:
while displaying the virtual touch pad in the first area and the virtual keyboard in the second area, receive a drag input starting in the first area; and
in response to identifying that the drag input is directed from the first area toward the second area while a contact of the drag input is maintained, change a representation of the virtual keyboard to preclude contact between the drag input and the virtual keyboard.

6. The electronic device of claim 5, wherein the at least one processor, when executing the instructions, is further configured to:
in response to identifying that the drag input is directed from the second area to the first area while the contact of the drag input is maintained, restore the representation of the virtual keyboard.

7. The electronic device of claim 1, wherein the at least one processor, when executing the instructions, is further configured to:
in response to identifying that an orientation of the electronic device is changed while displaying the virtual touch pad in the first area and the virtual keyboard in the second area, change an arrangement of the virtual touch pad and the virtual keyboard.

8. The electronic device of claim 1, wherein the at least one processor, when executing the instructions, is further configured to:
in response to receiving a touch input for moving a side of the virtual keyboard while displaying the virtual touch pad in the first area and the virtual keyboard in the second area, move the virtual keyboard from the second area.

9. The electronic device of claim 8, wherein the at least one processor, when executing the instructions, is further configured to:
in response to receiving a touch input for moving a different side of the virtual keyboard while displaying the virtual touch pad in the first area and the virtual keyboard in the second area, enlarge or reduce an area displaying the virtual keyboard.

10. The electronic device of claim 1,
wherein the at least one processor, when executing the instructions, is further configured to:
while the first user interface of the application is displayed by the external device, display a second user interface of the application in the first area and the second area, and
wherein the specified input corresponds to a touch input on a designated object in the second user interface.

11. The electronic device of claim 1, wherein the specified input corresponds to changing an orientation of the electronic device to a specified orientation.

12. The electronic device of claim 1,
wherein the at least one processor, when executing the instructions, is further configured to:
while the first user interface is displayed by the external device, display a second user interface of the application in the first area and the second area, and
wherein the specified input corresponds to a touch input on a text input portion included in the first user interface or a text input portion included in the second user interface.

13. The electronic device of claim 1, wherein the second area is disposed below the first area.

14. A non-transitory computer readable storage medium storing a program, wherein the program, when executed by a processor of an electronic device, causes the electronic device to:
execute an application;
transmit user interface information to another electronic device, wherein the other electronic device displays a first user interface of the application based on the user interface information;
in response to receiving a specified input while the first user interface is displayed by the other electronic device, display, on a display of the electronic device, a virtual touch pad in a first area and a virtual keyboard in a second area distinct from the first area;
while displaying the virtual touch pad in the first area and the virtual keyboard in the second area, receive a drag input moving from the first area toward the second area; and
while a contact of the drag input is maintained and in response to the drag input moving across a key of the virtual keyboard:
- disable a function of the virtual keyboard,
- display a visual representation on the virtual keyboard for indicating that the virtual keyboard is disabled and that the drag input continues while in the second area, in response to disabling the function of the virtual keyboard, and
- recognize the drag input as a part of an input on the virtual touch pad other than the virtual keyboard.

15. The non-transitory computer readable storage medium of claim 14, wherein the program, when executed by the processor of the electronic device, further causes the electronic device to:
- while the first user interface is displayed by the other electronic device, display a second user interface of the application in the first area and the second area; and
- in response to receiving the specified input, display the virtual touch pad and the virtual keyboard that are changed by the second user interface.

16. The non-transitory computer readable storage medium of claim 14, wherein the program, when executed by the processor of the electronic device, further causes the electronic device to:
- based on recognizing a path of the drag input, change, by using a communication circuitry of the electronic device, a representation of the first user interface being displayed on the other electronic device.

17. The non-transitory computer readable storage medium of claim 14, wherein the visual representation further comprises:
- a translucent layer over the virtual keyboard while a contact of the drag input is maintained.

18. The non-transitory computer readable storage medium of claim 14, wherein the program, when executed by the processor of the electronic device, further causes the electronic device to:
- while displaying the virtual touch pad in the first area and the virtual keyboard in the second area, receive a drag input starting from the first area; and
- in response to identifying that the drag input is directed from the first area toward the second area while a contact of the drag input is maintained, change the representation on the virtual keyboard to preclude contact between the drag input and the virtual keyboard.

19. The non-transitory computer readable storage medium of claim 18, wherein the program, when executed by the processor of the electronic device, further causes the electronic device to:
- in response to identifying that the drag input is directed from the second area to the first area while the contact of the drag input is maintained, restore the representation of the virtual keyboard.

* * * * *